(12) United States Patent
Tsaliah et al.

(10) Patent No.: US 12,252,260 B2
(45) Date of Patent: Mar. 18, 2025

(54) AERIAL VEHICLE BASED DAMAGE AVOIDANCE SYSTEM INCLUDING SAFETY APPARATUS FOR MITIGATING DAMAGE TO NEARBY BYSTANDERS OR VEHICLES

(71) Applicant: PARAZERO TECHNOLOGIES LTD, Kiryat Ono (IL)

(72) Inventors: Amir Tsaliah, Tel Aviv (IL); Ran Krauss, Tel Aviv (IL); Eden Abraham Attias, Tel Aviv (IL)

(73) Assignee: PARAZERO TECHNOLOGIES LTD, Kiryat Ono (IL)

( * ) Notice: Subject to any disclaimer, the term of this patent is extended or adjusted under 35 U.S.C. 154(b) by 343 days.

(21) Appl. No.: 17/700,335

(22) Filed: Mar. 21, 2022

(65) Prior Publication Data

US 2022/0204170 A1 Jun. 30, 2022

Related U.S. Application Data

(63) Continuation-in-part of application No. PCT/IL2020/051015, filed on Sep. 16, 2020, which is
(Continued)

(51) Int. Cl.
*B64D 17/80* (2006.01)
*B64D 17/72* (2006.01)
*B64U 70/83* (2023.01)

(52) U.S. Cl.
CPC .......... *B64D 17/80* (2013.01); *B64U 70/83* (2023.01); *B64D 17/72* (2013.01); *B64U 2201/20* (2023.01)

(58) Field of Classification Search
CPC ...... B64D 17/12; B64D 17/80; B64C 39/024; B64U 10/13; B64U 70/83; B64U 2201/20
(Continued)

(56) References Cited

U.S. PATENT DOCUMENTS

| 1,852,439 | A | 4/1932 | Stone |
| 2,953,333 | A | 9/1960 | Stencel |

(Continued)

FOREIGN PATENT DOCUMENTS

| CN | 1517272 A | 8/2004 |
| CN | 101767651 | 7/2010 |

(Continued)

OTHER PUBLICATIONS

Extended European Search Report for European Application No. 20865241.2, mailed Dec. 12, 2023.
(Continued)

*Primary Examiner* — Brady W Frazier
(74) *Attorney, Agent, or Firm* — Klarquist Sparkman, LLP

(57) ABSTRACT

Damage mitigating apparatus comprises in one embodiment a damage mitigating aerial vehicle that has sensors for detecting flight related characteristics and a communication unit for commanding activation of parachute deploying apparatus and of a lift generator deactivation unit following determination of a flight failure. In one embodiment, an aerial vehicle transmits a critical failure alarm signal to an unmanned aircraft traffic management system (UTM) following detection of the failure, and the UTM transmits a warning signal to neighboring aerial vehicles that are predicted to be in a vicinity of the descent path of the failed aerial vehicle to avoid collision with the failed aerial vehicle. The damage mitigating apparatus facilitates performance of a damage mitigating operation.

20 Claims, 25 Drawing Sheets

Related U.S. Application Data a continuation of application No. 16/576,882, filed on Sep. 20, 2019, now Pat. No. 11,286,053.

(58) Field of Classification Search
USPC .......................................................... 244/152
See application file for complete search history.

(56) References Cited

U.S. PATENT DOCUMENTS

| | | | |
|---|---|---|---|
| 3,133,718 | A | 5/1964 | Stencel |
| 3,281,098 | A | 10/1966 | Stencel et al. |
| 3,423,054 | A | 1/1969 | Stencel |
| 3,447,769 | A | 6/1969 | Stencel et al. |
| 3,638,287 | A | 2/1972 | Wright et al. |
| 3,759,469 | A | 9/1973 | Nimylowyez |
| 3,926,391 | A | 12/1975 | Nordine |
| 4,105,173 | A | 8/1978 | Bucker |
| 4,257,568 | A | 3/1981 | Bucker |
| 5,169,093 | A | 12/1992 | Schoffl |
| 5,409,187 | A | 4/1995 | Durham |
| 5,516,903 | A | 5/1996 | Singh et al. |
| 6,626,077 | B1 | 9/2003 | Gilbert |
| 7,607,488 | B2 | 10/2009 | Durham |
| 9,613,539 | B1* | 4/2017 | Lindskog ............. G08G 5/0056 |
| 10,059,459 | B2 | 8/2018 | Clark |
| 11,495,132 | B2 | 11/2022 | Borgyos et al. |
| 2002/0050534 | A1 | 5/2002 | Woodall et al. |
| 2015/0230072 | A1* | 8/2015 | Saigh .................... H04W 4/90 455/404.1 |
| 2015/0314881 | A1 | 11/2015 | Tsaliah et al. |
| 2016/0251083 | A1 | 9/2016 | Tsalliah et al. |
| 2016/0340049 | A1 | 11/2016 | Ferreyra et al. |
| 2017/0229022 | A1* | 8/2017 | Gurel ..................... G06V 20/64 |
| 2018/0026708 | A1 | 1/2018 | Priest |
| 2018/0137764 | A1 | 5/2018 | Lynar et al. |
| 2018/0245888 | A1 | 8/2018 | Banga et al. |
| 2019/0031346 | A1* | 1/2019 | Yong ................... A01M 7/0042 |
| 2019/0088145 | A1 | 3/2019 | Chambers et al. |
| 2019/0176987 | A1 | 6/2019 | Beecham |
| 2020/0033854 | A1* | 1/2020 | Jeong ................... G05D 1/0022 |
| 2020/0108939 | A1 | 4/2020 | Tsaliah et al. |
| 2020/0122830 | A1* | 4/2020 | Anderson ............... B60L 50/60 |
| 2020/0184834 | A1 | 6/2020 | Lohmiller et al. |

FOREIGN PATENT DOCUMENTS

| | | |
|---|---|---|
| CN | 101767651 A | 7/2010 |
| CN | 104118564 A | 10/2014 |
| CN | 106741969 A | 5/2017 |
| EP | 336910 | 10/1989 |
| EP | 0336910 A1 | 10/1989 |
| EP | 0716015 B1 | 6/1996 |
| EP | 1160159 A1 | 12/2001 |
| GB | 2569786 | 7/2019 |
| GB | 2569789 A | 7/2019 |
| KR | 101496892 | 3/2015 |
| KR | 101963826 B1 | 3/2019 |
| KR | 20190106848 | 9/2019 |
| WO | WO 2005/012086 | 2/2005 |
| WO | WO2013/123944 | 8/2013 |
| WO | WO 2013/123944 A1 | 8/2013 |
| WO | WO 2015059703 | 4/2015 |

OTHER PUBLICATIONS

International Preliminary Report on Patentability for PCT/IL2020/051015, mailed Dec. 13, 2021.
International Search Report and Written Opinion for PCT/IL2020/051015, mailed Dec. 29, 2020.
Office Action for Chinese Application No. 202080065908.4, mailed Oct. 26, 2023.
Partial Supplementary European Search Report for European Application No. 20865241.2, mailed Sep. 4, 2023.

\* cited by examiner

AERIAL VEHICLE BASED DAMAGE AVOIDANCE SYSTEM INCLUDING SAFETY APPARATUS FOR MITIGATING DAMAGE TO NEARBY BYSTANDERS OR VEHICLES

This is a continuation-in-part application of International Patent Application No. IL2020/051015 filed Sep. 16, 2020 and entitled "DAMAGE MITIGATING FOR AN AERIAL VEHICLE HAVING A DEPLOYABLE PARACHUTE", which claims priority from U.S. patent application Ser. No. 16/576,882 filed Sep. 20, 2019 and entitled "DAMAGE MITIGATING APPARATUS OPERABLE BY PRESSURIZED DEPLOYMENT OF A FABRIC," now U.S. Pat. No. 11,286,053, which is a continuation-in-part application of U.S. patent application Ser. No. 15/030,533 filed Apr. 29, 2016 and entitled "APPARATUS AND METHOD FOR RAPID DEPLOYMENT OF A PARACHUTE," now U.S. Pat. No. 10,421,552, which is a national phase application of International Patent Application No. IL2014/050920 filed Oct. 22, 2014 and entitled "APPARATUS AND METHOD FOR RAPID DEPLOYMENT OF A PARACHUTE", which claims priority from Israeli Patent Application No. 229068 filed Oct. 24, 2013 and entitled "APPARATUS AND METHOD FOR RAPID DEPLOYMENT OF A PARACHUTE".

FIELD OF THE INVENTION

The present invention relates to the field of unmanned aerial vehicles (UAVs). More particularly, the invention relates to a UAV, together with a cooperating system, which is configured to mitigate damage to bystanders and to neighboring UAVs when subject to a failure.

BACKGROUND OF THE INVENTION

The use of UAVs in low-altitude airspace, for example lower than 150 m, to perform various civilian missions such as the delivery of goods, agricultural monitoring and rescue operations has significantly increased in recent years. Although each UAV is directed along a unique flight path to avoid colliding with a neighboring UAV, no provisions are made to mitigate damage to bystanders and to neighboring UAVs when the UAV is experiencing an unanticipated failure that causes the UAV to be suddenly diverted from its flight path.

The deployment of a parachute according to prior art methods involves several steps, including a triggering action initiated by an operator or a user which causes the parachute canopy to be longitudinally extracted from the compartment in which it is stored, and a passive inflation process characterized by an influx of ambient air into the canopy which causes the latter to expand until achieving the desired canopy diameter. The canopy expansion is generally resisted by structural tension of the canopy fabric and by inertia, taking on the order of at least 5 seconds until fully expanded. Such a delay corresponds to a significant drop of tens of meters.

It would be desirable to provide apparatus by which a parachute could be rapidly deployed.

Some prior art apparatus is known for rapidly deploying a parachute, such as EP 336910, U.S. Pat. Nos. 4,257,568, 5,516,903, and CN 101767651. However, the time needed for fully deploying such prior art apparatus until the canopy is sufficiently inflated and expanded is excessive, precluding the use thereof for parachuting from a relatively low story of a building. Also, the prior art apparatus is either heavy, complicated to deploy or expensive, and is therefore not suitable for large scale use during a catastrophic event.

It is an object of the present invention to provide means for mitigating damage to neighboring UAVs when a given UAV in flight is caused to be diverted from its flight path after experiencing an unanticipated failure.

It is an additional object of the present invention to provide means for mitigating damage to bystanders when a given UAV in flight is caused to be diverted from its flight path after experiencing an unanticipated failure.

It is an additional object of the present invention to provide an apparatus and method for deploying a parachute or other fabrics at a significantly more rapid rate than what is achievable by prior art methods.

It is yet an additional object of the present invention to provide apparatus for rapidly and reliably deploying a parachute or other fabrics that is light, of simple construction, and inexpensive.

Other objects and advantages of the invention will become apparent as the description proceeds.

SUMMARY OF THE INVENTION

An aerial vehicle based damage avoidance system comprises a plurality of aerial vehicles, each flying along a unique flight path; one or more servers; and a base station in data communication with said plurality of aerial vehicles and said one or more servers,
wherein each of said aerial vehicles comprises safety apparatus for mitigating damage to nearby bystanders or aerial vehicles when the aerial vehicle is experiencing an unanticipated failure, said safety apparatus comprising one or more on-board sensors including a location detector which are configured to detect flight related characteristics; a processing unit configured to process outputs of each of the on-board sensors and to detect a critical failure; a remote communication unit configured to transmit an instantaneous location identifier to said base station and to generate and transmit an aerial vehicle specific critical failure alarm signal to said base station following detection of the critical failure, even when the failed aerial vehicle is suffering from a failure that prevents it from being properly guided; and an activation unit configured to activate a lift generator deactivation unit and a parachute deployment apparatus following detection of the critical failure, in order to initiate a descent operation along a descent path,
wherein said base station is configured to calculate the descent path of the failed UAV and to transmit an alert signal to all entities that are predicted to be within a danger range of the failed aerial vehicle relative to the calculated descent path.

In one aspect, the base station is configured to alert bystanders as to an approach of the failed aerial vehicle.

In one aspect, one of the one or more servers is an unmanned aircraft traffic management system (UTM) server which is configured to allocate an airspace to each of said plurality of aerial vehicles and to thereby grant authorization to fly along the unique flight path,
wherein said UTM server is configured to simultaneously transmit an update signal to all neighboring aerial vehicles that are predicted to cross the descent path of the failed aerial vehicle, said update signal being indicative of an aerial vehicle specific updated flight path that causes each of said neighboring aerial vehicles to urgently change its flight path to avoid collision with the failed aerial vehicle.

In one aspect, the base station is also in data communication with a local cellular base station that is in communication range of the descent path of the failed aerial vehicle, and is thereby configured to determine which one or more mobile phones held by corresponding users are located in the vicinity of the descent path of the failed aerial vehicle and to transmit an alert signal to the one or more mobiles phones over a cellular network to allow the corresponding users to find immediate shelter.

In one aspect, the base station is also in data communication with a receiver of an on-ground siren, so that a warning sound will be immediately emitted thereby, to indicate to bystanders located in damage range of the descent path of the failed aerial vehicle that they must immediately significantly change their location or seek shelter.

In one aspect, the processing unit is additionally configured to additionally process the outputs of each of the on-board sensors, to detect a flight abnormality in the aerial vehicle in which the processing unit is mounted, and to initiate generation of another aerial vehicle specific updated flight path that forces the aerial vehicle to fly to a specified ground station and to undergo a repair or maintenance operation, a flight abnormality being a failure of a lower degree than the critical failure.

In one aspect, the failed aerial vehicle is an unmanned fixed-wing aircraft which is configured to glide following deactivation of each of the at least one lift generator by the lift generator deactivation unit.

In one aspect, one of the on-board sensors is an accelerometer and a parachute deploying operation is automatically initiable following detection of a critical failure acceleration that is greater than a predetermined value which is indicative of commencement of a free fall rather than of a gliding operation.

In one aspect, the activation unit further comprises a smart landing mechanism configured to perform emergency landing under guidance of a smart landing controller in conjunction with maneuvering apparatus. The smart landing controller may be operable to command deployment of an airbag for reducing impact with an existing surface during an emergency landing procedure.

In one aspect, the smart landing mechanism comprises a downwardly facing collision avoidance system that is operable to calculate a required direction of downward travel in order to avoid a detected obstacle. The smart landing mechanism may comprise at least one LiDAR sensor for detecting obstacles.

In one aspect, the safety apparatus further comprises a backup power unit that is independent of the battery configured to power at least one lift generator of the aerial vehicle.

In one aspect, the remote communication unit is configured to transmit an instantaneous location identifier to said base station and to generate and transmit an aerial vehicle specific critical failure alarm signal to said base station following detection of the critical failure, even when the failed aerial vehicle is suffering from a guidance-preventing failure selected from the group consisting of a predetermined drop in voltage of a battery configured to power at least one lift generator of the aerial vehicle, a loss in flight dependent communication, a failure to an autopilot, and a failure in a positioning system of the aerial vehicle.

A damage mitigating aerial vehicle comprises an aerial vehicle body configured with at least one lift generator, such as a rotor; parachute deploying apparatus interactable with an undeployed parachute which is retained in a chamber attached to said aerial vehicle body; a controller of drive means for said at least one rotor; a rotor deactivation unit in electrical communication with said controller; one or more aerial vehicle mounted sensors which are configured to detect flight related characteristics for said aerial vehicle; and a communication unit in electrical communication with said parachute deploying apparatus and with said controller of the rotor drive means, said communication unit comprising a failure detection unit which is responsive to said detected flight related characteristics to determine when said detected flight related characteristics are indicative of a flight failure, wherein said communication unit is operable to command activation of said parachute deploying apparatus and said rotor deactivation unit following determination of the flight failure, wherein deactivation of each of said at least one rotor by said rotor deactivation unit ensures that the parachute that is being expanded by said parachute deploying apparatus will not become entangled with rotating rotor-associated blades.

Damage mitigating apparatus comprises a chamber in which an undeployed damage mitigating fabric is retained and secured to a platform; a manifold positioned within an interior of, and fixed to, said chamber, with said manifold is releasably coupled a single vessel within which pressurized gas is generated; a gas generator which cooperates with said vessel; a plurality of hollow tubes which extend distally from, and are in fluid communication with, said manifold; and a plurality of projectiles, each of which is attached to a corresponding portion of said undeployed fabric and formed with a rod that is receivable in a corresponding one of said tubes, wherein the pressurized gas which is generated upon triggering of said gas generator is flowable through each of said tubes to propel said plurality of projectiles and to cause said fabric to become deployed, wherein said apparatus is configured to cause said fabric to achieve a desired expanded dimension simultaneously with ejection of said plurality of projectiles from said chamber and to perform a damage mitigating operation.

The plurality of distal tubes may extend obliquely or non-obliquely from the manifold.

As referred to herein, directional terms such as "bottom", "top", and "upper" are described with respect to an orientation of the apparatus whereby the tubes extend upwardly from the manifold; however, the invention is also operable when the manifold is disposed at any other desired orientation.

The generated pressurized gas is dischargeable from an aperture formed in the vessel to an interior of the manifold and is flowable from said manifold interior through of each of the tubes simultaneously. Each of the projectiles is preferably propelled a predetermined distance by the pressurized gas.

In one aspect, the vessel contains a solid propellant consisting of materials that normally do not chemically react with each other and a pyrotechnic device for initiating a reaction with said propellant.

In one aspect, the vessel contains a compressed or liquid gas and the gas generator is a spring loaded puncturing mechanism for generating pressurized gas upon puncturing the vessel.

In one aspect, the fabric is fully deployable within less than a second, e.g. within less than 0.3 sec, following a gas generator triggering event. By virtue of such a rapid parachute deploying operation, a user will be assured of being protected by the apparatus even when jumping from a low story of a building, for example 20 m above ground level.

In one aspect, each of the projectiles is sealingly engageable with a corresponding tube.

A method for performing a damage mitigating operation by rapidly deploying a fabric, comprising the steps of positioning a manifold, from which a plurality of hollow tubes extend distally, and are in fluid communication therewith, within an interior of a chamber directed to a target of a damage mitigating operation, wherein a single vessel within which pressurized gas is generatable is releasably coupled with said manifold; introducing a rod terminating with a projectile into a corresponding one of said tubes and attaching said projectile to a corresponding peripheral portion of an undeployed fabric; storing said fabric within said chamber so as to be in a folded condition such that each folded portion of said fabric is separated without contact from another folded portion with the exception of an expandable crease therebetween; and performing a triggering action which causes pressurized gas generated within the vessel to flow through said manifold to each of said plurality of hollow tubes and each of said projectiles to be distally propelled for a predetermined distance, whereby said fabric achieves a desired expanded dimension simultaneously with ejection of said fabric from said chamber that facilitates performance of a damage mitigating operation.

DETAILED DESCRIPTION OF THE INVENTION

The present invention provides novel safety apparatus for an aerial vehicle, whether a manned aerial vehicle or an unmanned aerial vehicle (UAV), which mitigates damage to bystanders and to neighboring aerial vehicles when the given aerial vehicle is experiencing an unanticipated failure. Although the following description relates to a UAV, it will be appreciated that the invention is likewise applicable to a manned aerial vehicle mutatis mutandis.

The safety apparatus comprises a sensor-based, on-board failure detection unit that is capable of identifying a critical UAV failure and various devices, such as parachute deployment apparatus and communication equipment for transmitting distress or alarm signals, which are automatically activated in response to identification of the critical failure. The safety apparatus is operational independently of the conventional flight dependent systems for the UAV, one or more of which may be malfunctioned due to the critical failure.

The parachute deployment apparatus comprises propellable projectiles for rapidly deploying a parachute within a time period significantly less than a second, and even as less as 0.3 sec, to ensure a life saving parachute deployment operation when located at a relatively low altitude such as 20 m above ground level.

The safety apparatus is usable in conjunction with various types of UAV, such as a fixed-wing aircraft for carrying a relatively heavy payload while lift is generated by the forward airspeed provided by a propeller driven by an electric motor, rotorcraft which generates lift by a set of rotors, including multirotor aircraft for example of four, six or eight rotors by which aircraft motion is controlled by varying the relative speed of each rotor, vertical take-off and landing (VTOL) vehicles, a helicopter comprising variable pitch rotors, and a gyrocopter that uses an unpowered rotor in free autorotation to develop lift while forward thrust is provided by an engine-driven propeller. Each of these rotors and propellers may be referred to as a "lift generator", and the motor or engine configured to drive the lift generator may be referred to as "drive means".

In other embodiments, the safety apparatus is secured to a fixed or movable platform to mitigate damage to property or to nearby humans.

Figure 1:
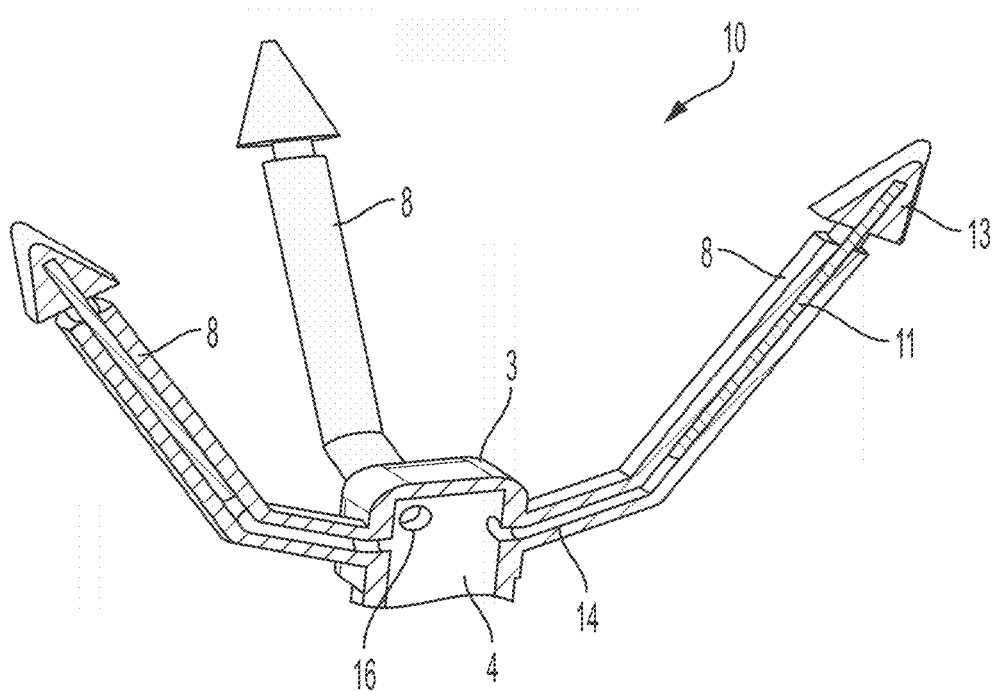
FIG. 1 is a perspective cross sectional view of a portion of parachute deploying apparatus, according to one embodiment of the present invention.

FIG. 1 illustrates apparatus 10, according to one embodiment of the present invention. Apparatus 10 comprises a substantially vertically disposed manifold 3 from which obliquely and upwardly extend a plurality of hollow tubes 8, e.g. three or four, in communication with the interior 4 of manifold 3 via a corresponding aperture 16 formed in the inner surface of the manifold. A rod 11 terminating with a larger surface projectile 13, e.g. with an arrow-shaped or tear-shaped head, is inserted into a corresponding tube 8. A draw cord is attached between each projectile 13 and a corresponding peripheral portion of the parachute canopy. These draw cords are in addition to the suspension lines that connect the canopy to the object to be parachuted, as well known to those skilled in the art.

To prevent tearing, the canopy may be made of reinforced netting, for example Nylon 66 ripstop fabric. The undeployed parachute canopy is folded on top of manifold 3, and is retained in a chamber illustrated in FIG. 13.

Manifold 3 may have a rectangular vertical cross section as shown, or may be configured in other ways as well.

Tubes 8 are all oriented at the same angle, e.g. 30 degrees relative to a vertical plane, to ensure uniform opening of the parachute. An intermediate tube 14 of shorter length and oriented at a larger angle than the rod receiving tubes 8 may extend from manifold 3 to a corresponding tube 8.

Figure 2:
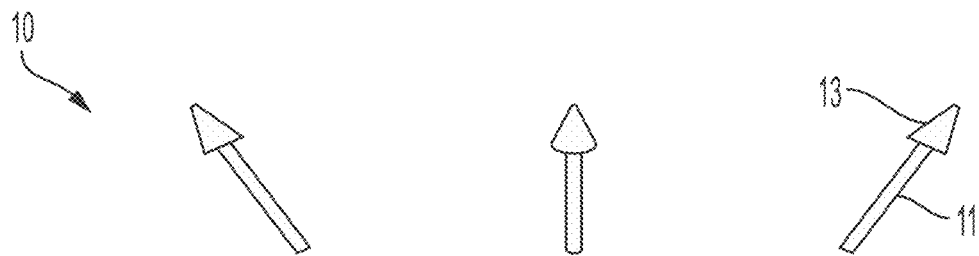
FIG. 2 is an exploded, perspective view of the parachute deploying apparatus of FIG. 1.
Figure 2:
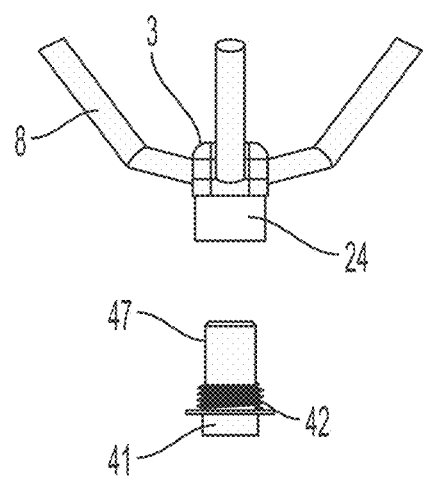

As shown in the exploded version of apparatus 10 in FIG. 2, a single, small sized pressure vessel 47 constituting a micro gas generator (MGG) is threadedly engageable, by external threading 42 formed in a bottom region of cylinder 41 which defines the vessel, with internal threading formed within cylinder 24 integral with, and extending downwardly from, manifold 3. Projectile 13 is shown to be integrally formed with a corresponding rod 11. All components of apparatus 10 that are exposed to the generated gas, including manifold 3, tubes 8, rods 11 and projectiles 13 are made of heat resistant material. By employing a single MGG that efficiently deploys a parachute, the weight and therefore the cost of the apparatus are significantly reduced with respect to the prior art.

Figure 3:
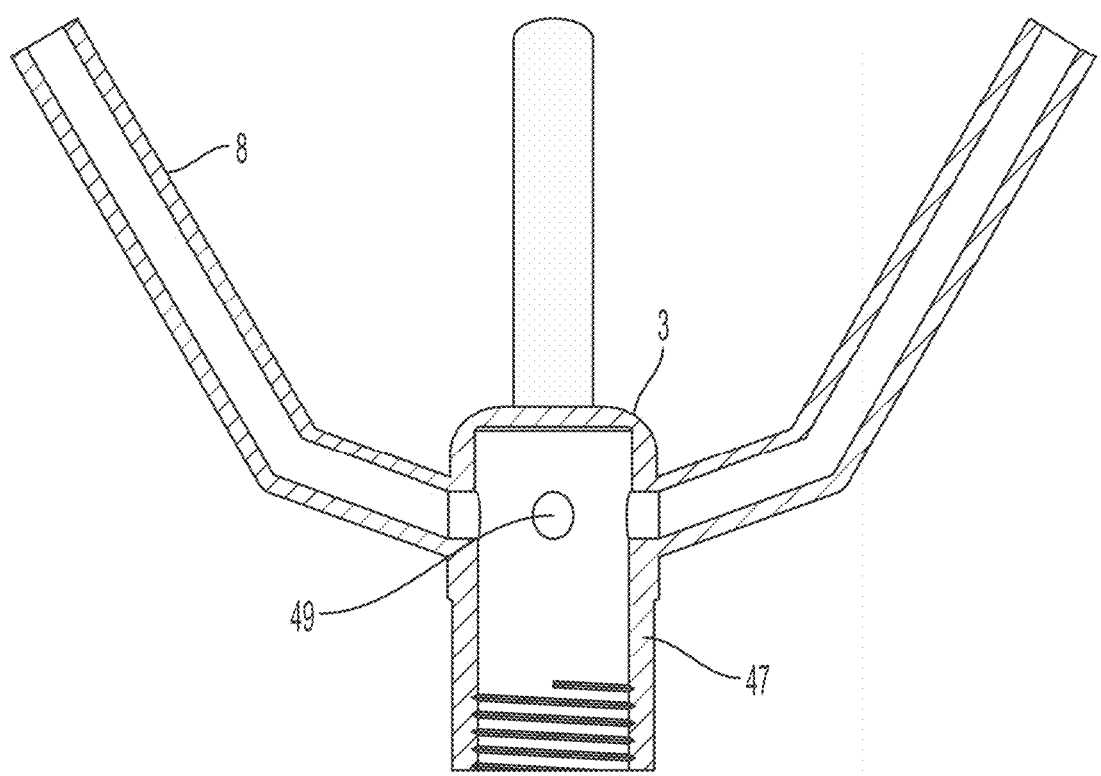
FIG. 3 is a vertical cross sectional view of a portion of the parachute deploying apparatus of FIG. 1, showing vessel comprising a gas generator coupled therewith.

As shown in FIG. 3, an aperture 49 is formed in an upper region of vessel 47, e.g. in its circumferential wall, through which the generated gas is dischargeable into the interior of manifold 3, when the vessel is fully received within the interior of the manifold, and then through the interior of each tube 8, in order to cause the projectiles to be propelled a predetermined distance.

Alternatively, pressure vessel 47 may be positioned on top of the manifold and the aperture through which the generated gas is dischargeable may be formed in a lower region of the vessel.

Figure 4:
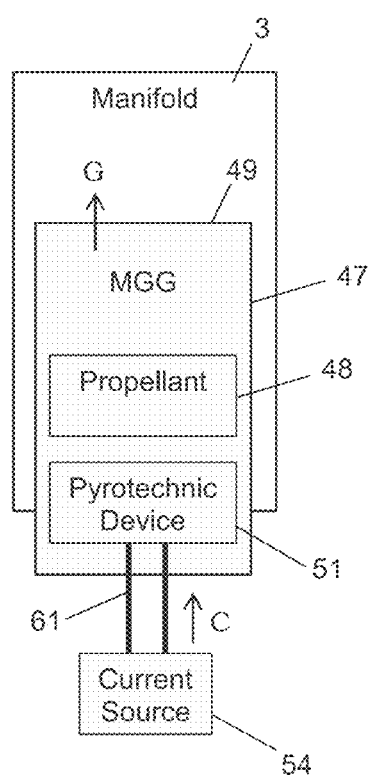
FIG. 4 is a schematic illustration of a parachute deploying event involving the vessel of FIG. 3.

Referring now to FIG. 4, vessel 47 contains a solid propellant 48 consisting of materials that normally do not chemically react with each other and a pyrotechnic device 51 for initiating a reaction with propellant 48.

The vessel 47 is of sufficiently small dimensions, e.g. having a diameter of 2 cm and a length of 7 cm, in order to be compactly retained in the manifold cylinder when not in use, yet is highly efficient in terms of its gas generating capability. A vessel 47 is replaceable upon conclusion of a parachute deployment operation.

Pyrotechnic device 51 may be activated by an electrical current source 54 for heating a conductor of the device above the ignition temperature of a combustible material in contact therewith. Ignition of the combustible material initiates the MGG, causing a rapid chemical reaction involving propellant 48 that generates a large volume of pressurized gas G, e.g. nitrogen, within the manifold interior. The materials of propellant 48 and the current and voltage supplied by electrical current source 54 may be selected so as cause a highly exothermic reaction.

Figure 5:
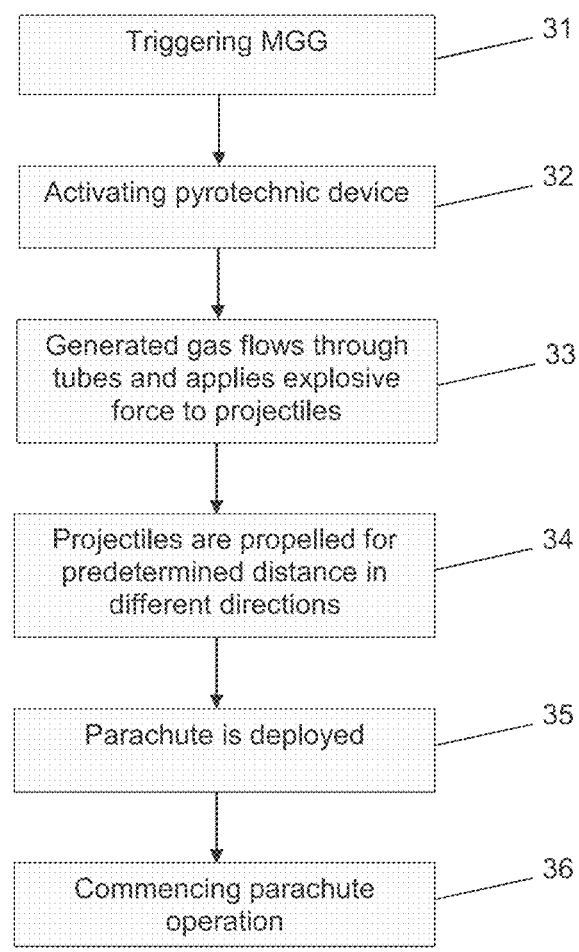
FIG. 5 is a method for deploying a parachute, according to one embodiment of the invention.

In one implementation as illustrated in FIG. 5, a user desiring to deploy a parachute according to the teachings of the present invention triggers the MGG in step 31 by electrical or mechanical means well known to those skilled in the art, which need not be described for purposes of brevity. As a result of the triggering operation, the pyrotechnic device becomes activated in step 32, causing the constituent components of the propellant to react and to generate energy intensive gas. The generated gas simultaneously flows through each tube extending from the manifold in step 33, applying an explosive force onto a corresponding projectile. The explosive force is converted into momentum, and each projectile is therefore propelled in a different direction for a predetermined distance in step 34. This distance, which is generally the sum of the length of the draw cord and the canopy radius, is reliably achieved by providing a sufficient dose of combustible material and a sufficient amount of activation current, to cause the parachute to be deployed in step 35 by being expanded to the desired canopy diameter.

After being deployed, ambient air is received in the interior of the parachute, causing the latter to be retained in a buoyancy generating inflated condition. While the canopy is fully expanded, the projectiles remain attached thereto by a corresponding draw cord after having transferring their kinetic energy to the canopy to urge the latter to an expanded condition. The weight of each projectile, e.g. 23 gm, is negligible with respect to the buoyancy force generated by the parachute, and therefore will not significantly impact the buoyancy of the parachute. A parachuting operation is then commenced in step 36.

In one embodiment, the projectile head is sealed within the inclined tube. In this fashion, the gas pressure within the tube can be increased, to allow the projectile to be propelled a further distance.

It will be appreciated that the various components that are exposed to the generated gas need not be made of heat resistant material when other types of gas such as carbon dioxide or nitrogen are employed.

FIGS. 8-13 illustrate another embodiment of the invention whereby the pressurized gas is generated by means of a spring loaded puncturing mechanism for generating pressurized gas, e.g. carbon dioxide, on demand upon puncturing a vessel containing a compressed or liquid gas.

Figure 8:
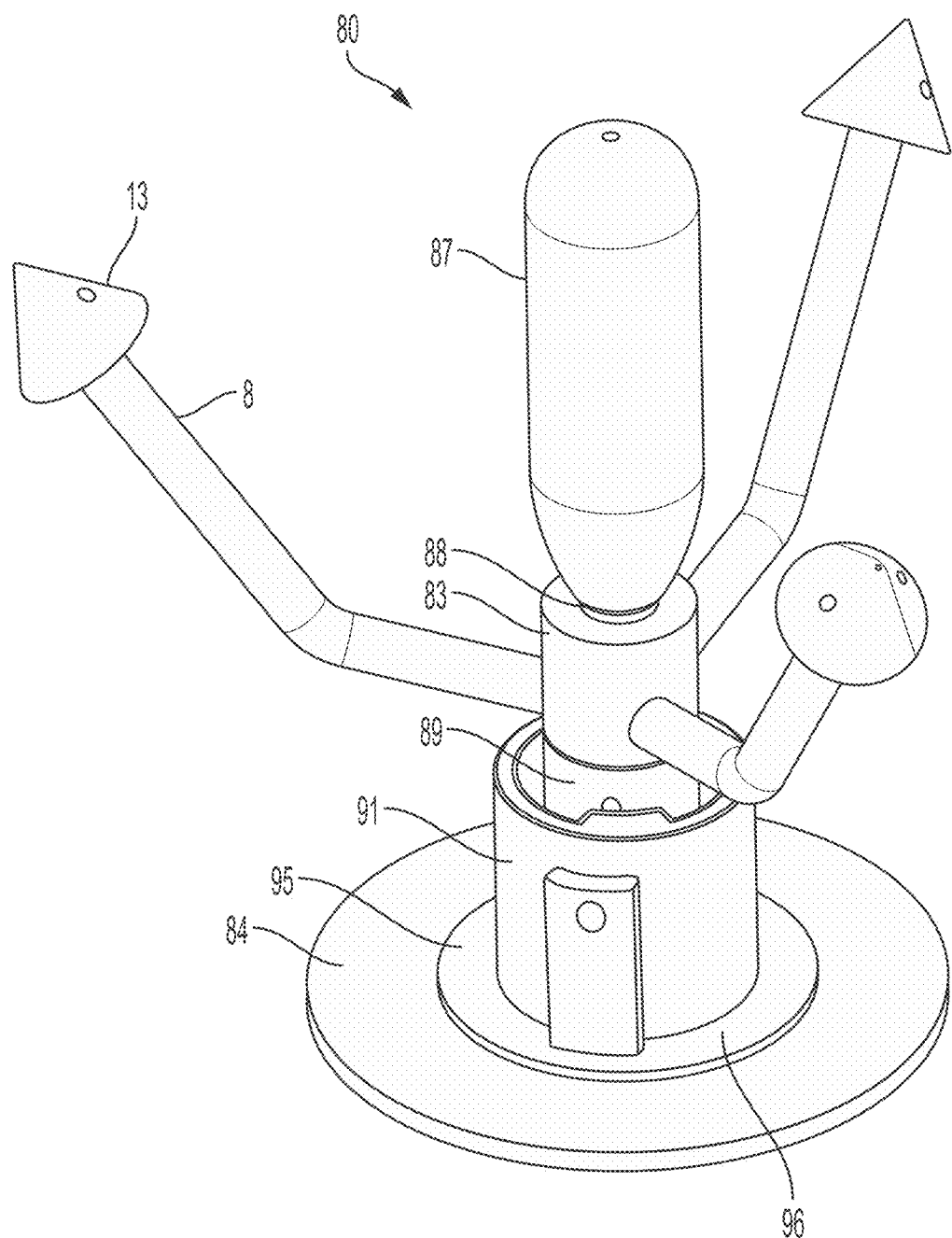
FIG. 8 is a perspective view of parachute deploying apparatus, according to another embodiment of the invention.

FIG. 8 illustrates an assembled, ready to trigger parachute deploying apparatus 80, which comprises manifold 83 having three inclined tubes 8 into each of which a corresponding arrow-headed projectile 13 is inserted, compressed gas vessel 87 releasably engaged with the top of manifold 83, hollow spring housing 89 threadedly engageable with manifold 83 and in which is housed a spring and hammer for driving the puncturing mechanism, an outer tubular rotatable element 91 for encircling spring housing 89 and for selectively releasing a vertically displaceable hammer, and a bottom circular plate 95 positioned above larger circular plate 84 and below rotatable element 91 which is formed with a groove 96 for limiting the angular displacement of element 91. At the mouth 88 of vessel 87 is formed a pierceable metallic diaphragm, generally near the threading of the vessel.

Figure 9:
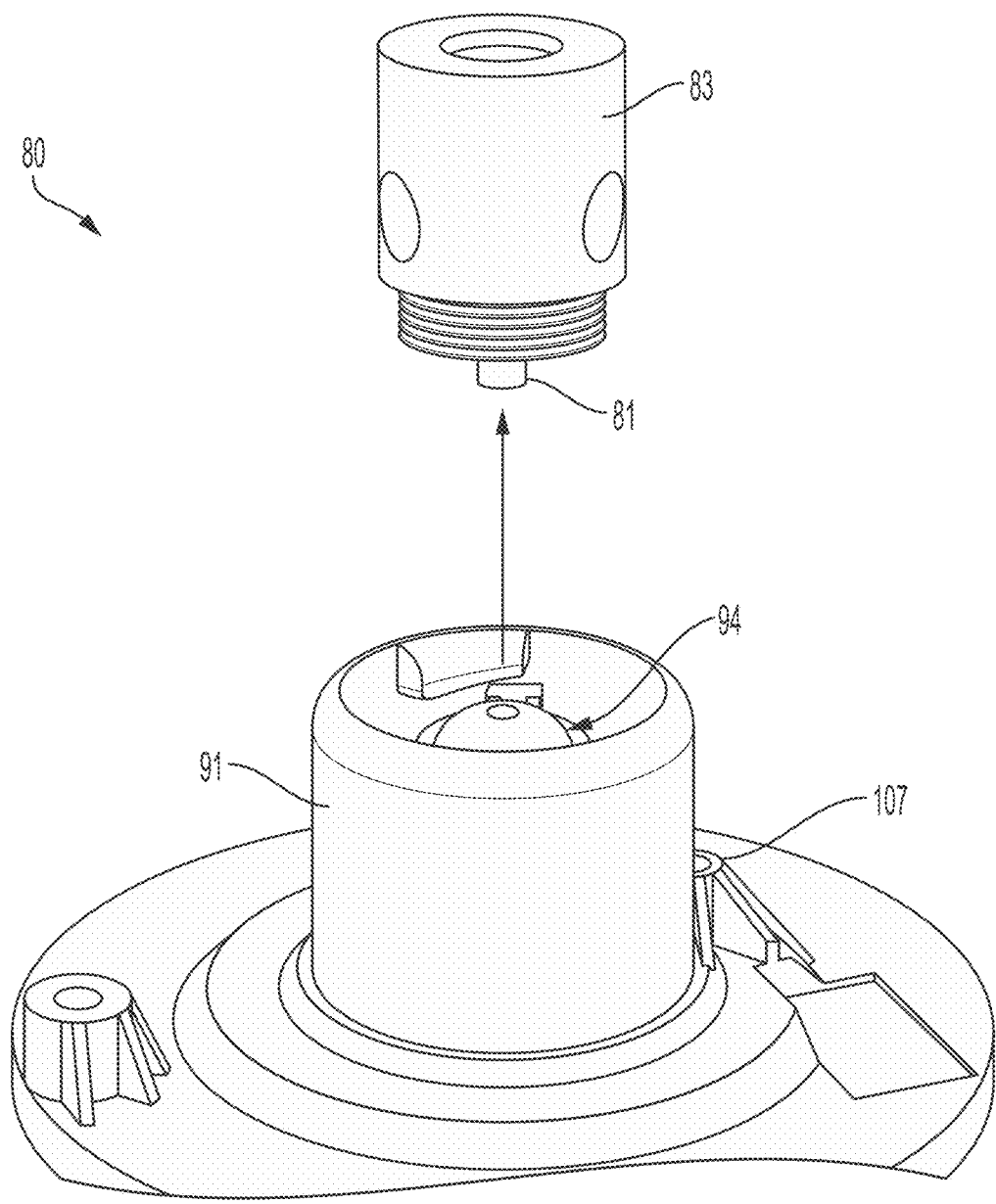
FIG. 9 is a schematic, perspective view of the apparatus of FIG. 8 when the spring housing is removed, showing a vertically displaceable hammer for initiating a gas generation event.

FIG. 9 schematically illustrates apparatus 80 when the spring housing is removed, showing hammer 94 positioned internally to rotatable element 91 and which is vertically displaceable, on release of the spring force provided within the spring housing, at a sufficiently high speed to upwardly drive the bottom of pointed striking pin 81 so as to pierce the diaphragm and cause the liquid gas to change state in order to suitably propel the projectiles. Striking pin 81 is normally positioned within manifold 83 below the diaphragm of the gas generating vessel.

Figure 10:
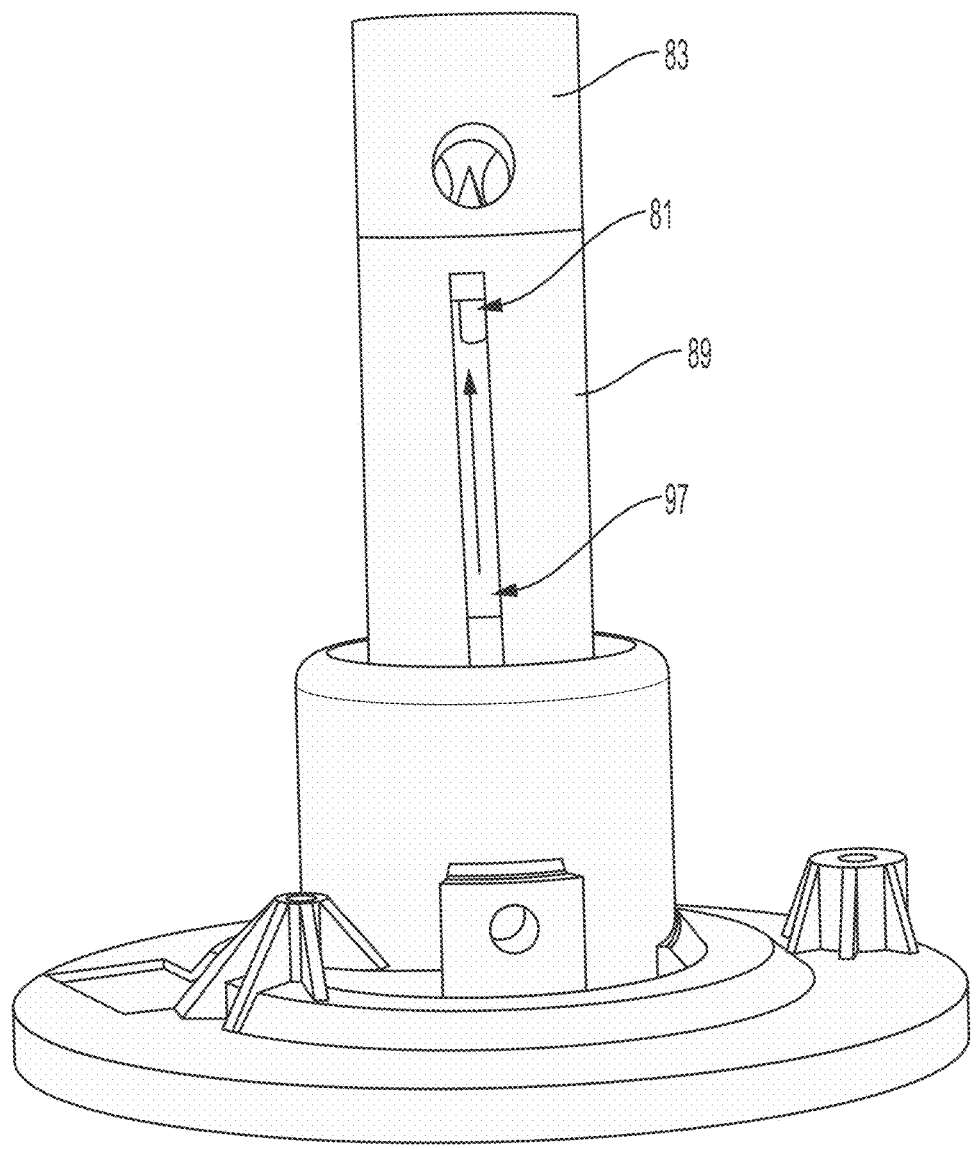
FIG. 10 is a side view of the apparatus of FIG. 8 when the hammer and manifold tubes are removed, showing the striking pin in a vertically displaced position.

FIG. 10 illustrates striking pin 81 after it has been upwardly driven. As shown, spring housing 89 is formed with two opposed vertical grooves 97 through each of which a corresponding arm of the hammer is able to pass.

Figure 11:
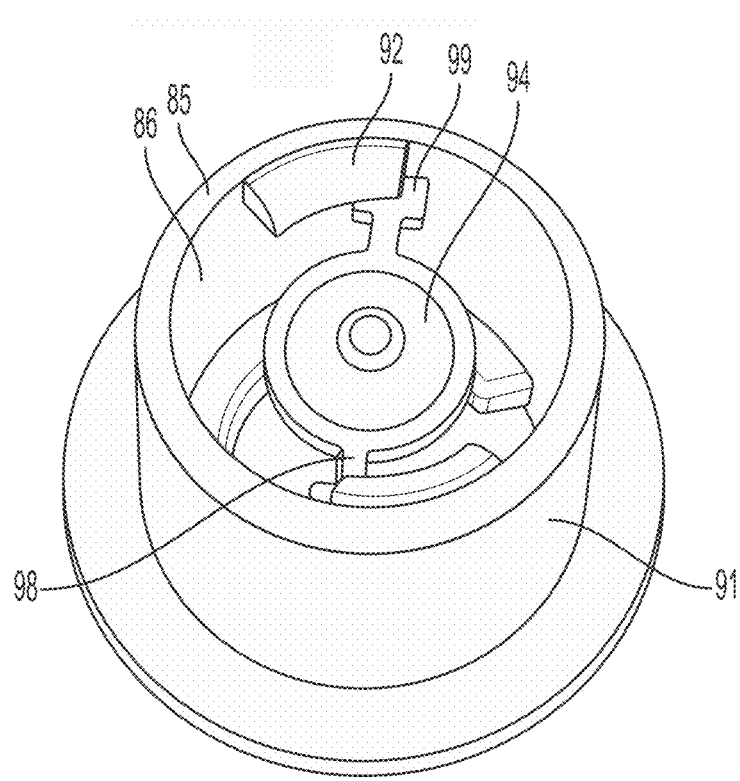
FIG. 11 is a perspective view from the top of the apparatus of FIG. 8 when the manifold and spring housing are removed, showing the hammer in a restrained position.

FIG. 11 illustrates the means for selectively releasing hammer 94. Rotatable element 91 has two opposed restrainers 92 circumferentially extending a limited distance along its inner face 86, adjacent to its rim 85. After the spring within the spring housing is tensed by an external tensioning device, as well known to those skilled in the art, hammer 94 is positioned such that the two protrusions 99 terminating at the end of a corresponding arm 98 which radially extends from the main central portion of the hammer are below a corresponding restrainer 92 and prevented from moving. When rotatable element 91 is circumferentially shifted, protrusions 99 become unrestrained, allowing hammer 94 to be vertically displaced.

Figure 12:
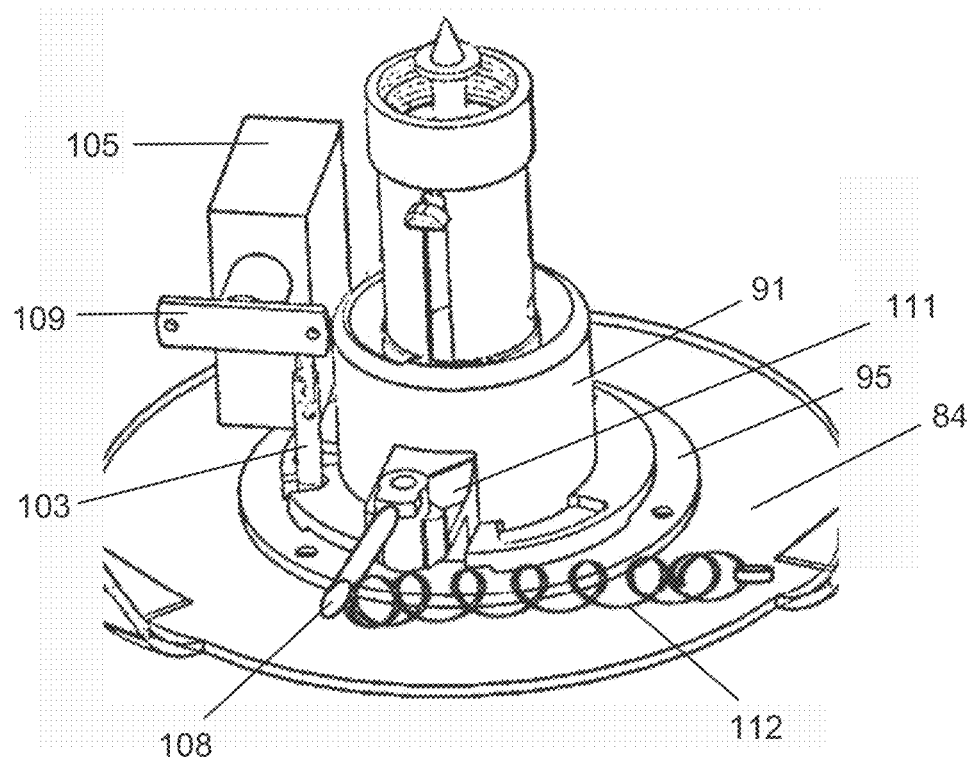
FIG. 12 is a perspective view of the apparatus of FIG. 8 when the manifold is removed, showing a disengaging unit for initiating rotation of a rotatable element.

FIG. 12 illustrates the disengaging unit, for initiating rotation of rotatable element 91 and the resulting forceful vertical displacement of the hammer. External spring 112 is attached at one end to bottom plate 84 and at the other end to rod 108 horizontally extending from rotatable element 91, for example from block 111 attached to the outer wall of rotatable element 91. After upper plate 95 is rotated to extend external spring 112, vertically oriented pin 103 in releasable engagement with ring 107 (FIG. 9) protruding outwardly from rotatable element 91 is inserted within an aperture formed in plate 95, to secure rotatable element 91 while external spring 112 is tensed. Electrical motor 105, e.g. a servomotor, rotatably drives cam 109, when activated, to disengage pin 103 from plate 95 and to enable angular displacement of rotatable element 91 upon release of the spring force applied by external spring 112.

Figure 13:
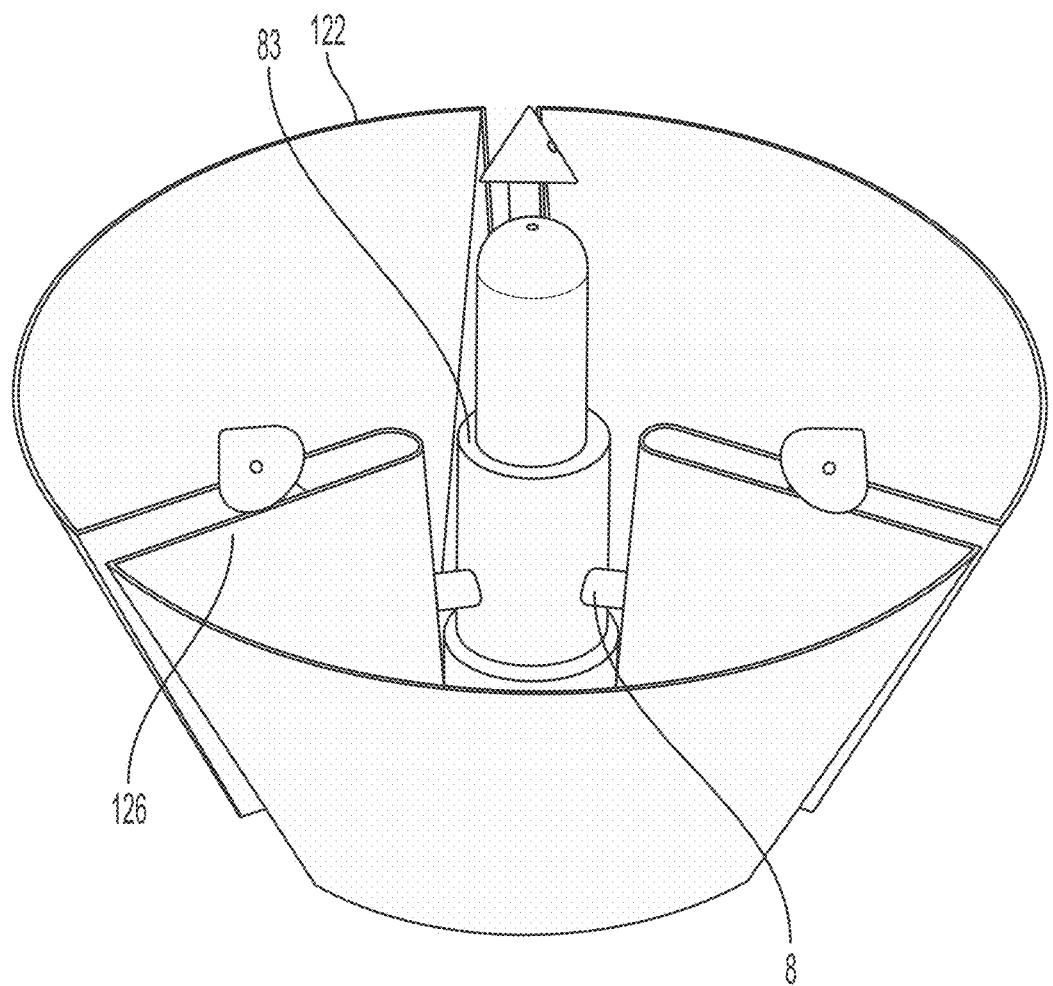
FIG. 13 is a perspective view of a chamber within which the apparatus of FIG. 8 is positioned and an undeployed parachute canopy is stored.

FIG. 13 illustrates circular chamber 122 in which the undeployed parachute is stored. Chamber 122 has a discontinuous wall, which is provided with a plurality of circumferentially spaced U-shaped portions 126 extending vertically along the entire height of chamber 122. Manifold 83 is positioned within the interior of chamber 122, internally to each of the U-shaped portions 126. To facilitate positioning of each projectile rod 8 within the interior of a corresponding U-shaped portion 126 in preparation to be propelled, the internal wall of each U-shaped portion 126 facing manifold 83 may be formed with a bottom groove. Chamber 122 is connected to the object to be parachuted.

Alternatively, the puncturing mechanism is also operable when the compressed gas vessel is releasably engaged with the bottom of the manifold.

A parachute deployment operation may be initiated by a user who is entrapped within a skyscraper during a catastrophic event. As no other means of rescue is anticipated, the user mounts a harness to which is attached the apparatus of the present invention onto his upper torso. After the user jumps from an upper story, the MGG is triggered in midair while the projectiles are propelled behind, and rearwardly from, the user, allowing the parachute to be deployed within 0.3 sec following the triggering action due to the fast acting apparatus. This parachute deploying duration corresponds to a falling distance of only approximately 2 m. By virtue of the fast acting apparatus, a user will be assured of being protected even when jumping from a relatively low altitude such as 20 m above ground level, i.e. at a low story of a building. After descending to safety, the used vessel that generated the projectile propelling gas is replaced and the deployed parachute is folded, in anticipation of another parachute deployment operation, if necessary.

It will be appreciated that a parachute deployment operation may be initiated in response to many other scenarios that require an object to be parachuted.

Alternatively, the parachute deploying apparatus may be provided on light aviation aircraft, including an unmanned aerial vehicle (UAV) and Personal Aerial Vehicle (PAV), regardless of shape, construction material and geometry.

Figure 6:
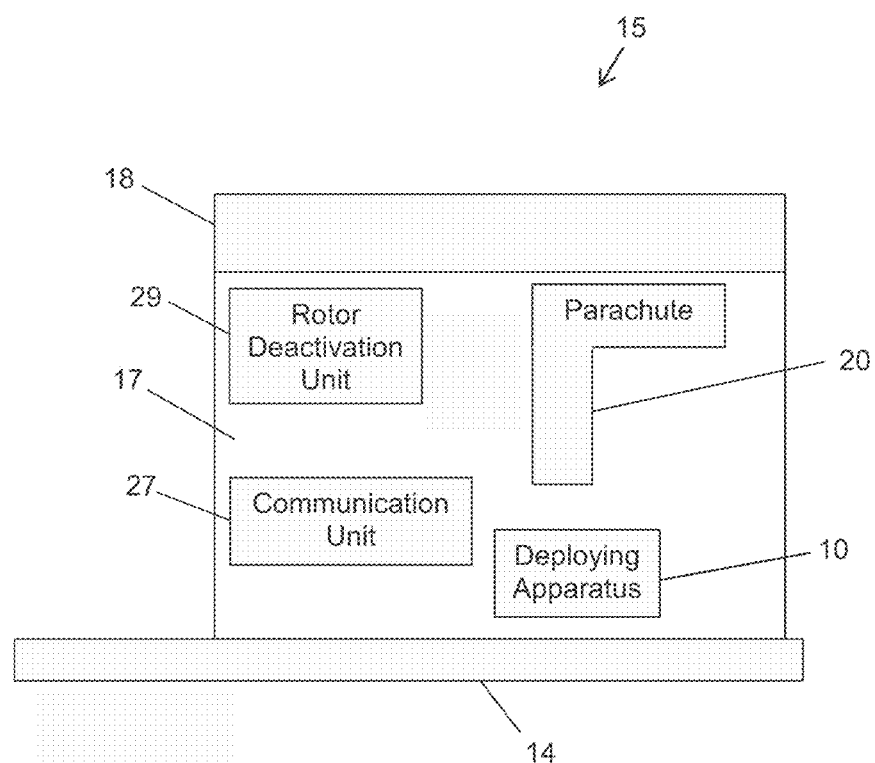
FIG. 6 is a block diagram of safety apparatus including an undeployed parachute assembly and the apparatus of FIG. 1.
Figure 7A:
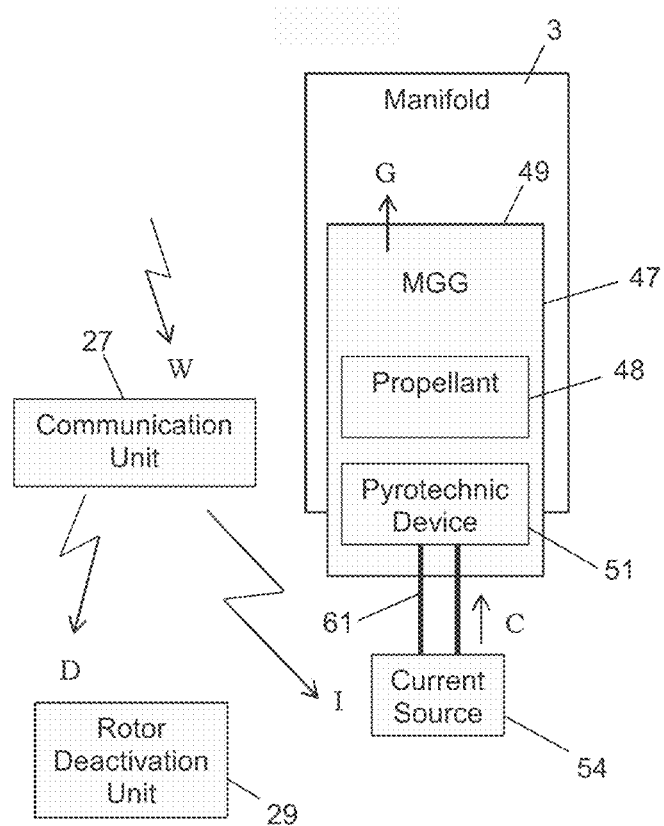
FIG. 7A is a schematic illustration of a parachute deploying event involving the safety apparatus of FIG. 6.
Figure 7B:
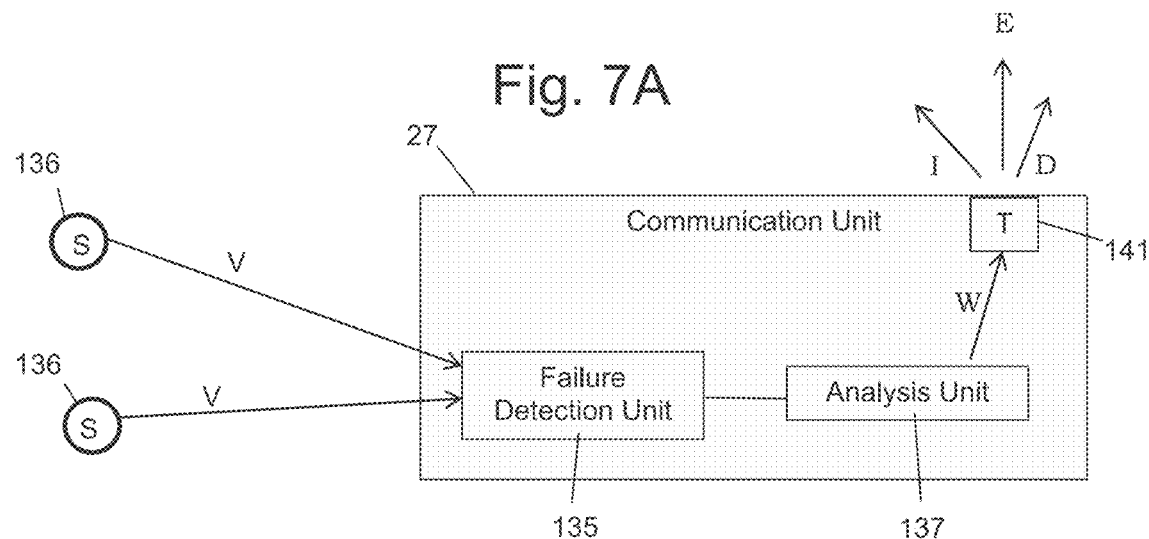
FIG. 7B is a schematic illustration of an on-board failure detection unit.

In this embodiment, as schematically illustrated in FIGS. 6 and 7A-B, safety apparatus 15 is retained within a chamber 17 attached to a support element 14 of the aircraft and has a detachable lid 18. Safety apparatus 15 may comprise expandable parachute assembly 20 shown in a folded condition, parachute deploying apparatus 10 for instantly deploying parachute assembly 20, e.g. made of Kevlar®, upon demand, a wireless communication unit 27 for remotely controlling operation of the safety apparatus, and a rotor deactivation unit 29 synchronized with parachute deploying apparatus 10 for preventing damage to the parachute when being expanded. Lid 18 becomes detached from chamber 17 when the parachute becomes sufficiently expanded so as to apply a force onto the lid.

An operator interacting with a remote flight controller may transmit a wireless duress indicating signal W to the transceiver of communication unit 27 upon detection that the UAV has been subjected to conditions of duress requiring deployment of the parachute. After receiving signal W, communication unit 27 transmits a deactivation signal D for operating rotor deactivation unit 29, which is in electrical communication with a controller 39 of the rotor drive means. Deactivation of the rotors will ensure that the expanding parachute will not become entangled with the rotating blades. Simultaneously with the transmission of signal D, or shortly thereafter, communication unit 27 transmits an initiation signal I to current source 54, which in turn generates a suitable current C for activating pyrotechnic device 51. Current C flows to the pyrotechnic device 51 of vessel 47 via contacts 61 extending from the bottom end of the vessel. Activation of pyrotechnic device 51 causes the constituent components of propellant 48 to react and to generate gas G, which is discharged into manifold 3 in order to propel the plurality of projectiles.

The conditions of duress may be detected remotely by the operator in conjunction with a remote processor, or, alternatively, may be determined by an on-board failure detection unit 135, as shown in FIG. 7B. Failure detection unit 135 of communication unit 27 receives a signal V output from each on-board sensor 136, which is configured to detect a different UAV-associated flight related characteristic, and an analysis module 139 processes and analyzes all received signals V according to predetermined stored instructions. A wireless duress indicating signal W will be generated by analysis module 139 upon determination that the UAV has become subjected to a failure that requires termination of a current flight, whether a relative low-degree failure or a relative high-degree failure. A relative high-degree failure is generally uncorrectable and has a risk of being catastrophic and endangering nearby UAVs or bystanders, and therefore requires deployment of the parachute. The transceiver 141 of communication unit 27 transmits parachute deployment apparatus initiation signal I, rotor deactivation signal D, and an encrypted signal E transmittable to a remote station as will described hereinafter, following generation of duress indicating signal W.

One way of distinguishing between a relative low-degree failure and a relative high-degree failure is by the amplitude of vibrations reflective of vibrations experienced by the UAV body during flight. Another way is by the magnitude of angular motion such as roll, pitch and yaw experienced by the UAV body during flight, which may be indicative of a mechanical failure, such as when a rotor arm is insufficiently tightened to the UAV body.

It will be appreciated that a remote processor accessible to the operator may also receive a signal V output from each on-board sensor 136.

The fully deployed parachute will be able to intercept moving aircraft fragments, if any, and to sufficiently slow the descent of the disabled aircraft so as to minimize damage of a collision involving the aircraft.

The entire safety apparatus may weigh as little as 1-1.5 kg when the object to be parachuted is a human, or even less for lighter parachuted objects. For example, the safety apparatus may weigh 260 gm for a parachuted object weighing 3.5 kg or 450 gm for a parachuted object weighing 7 kg.

Figure 14:
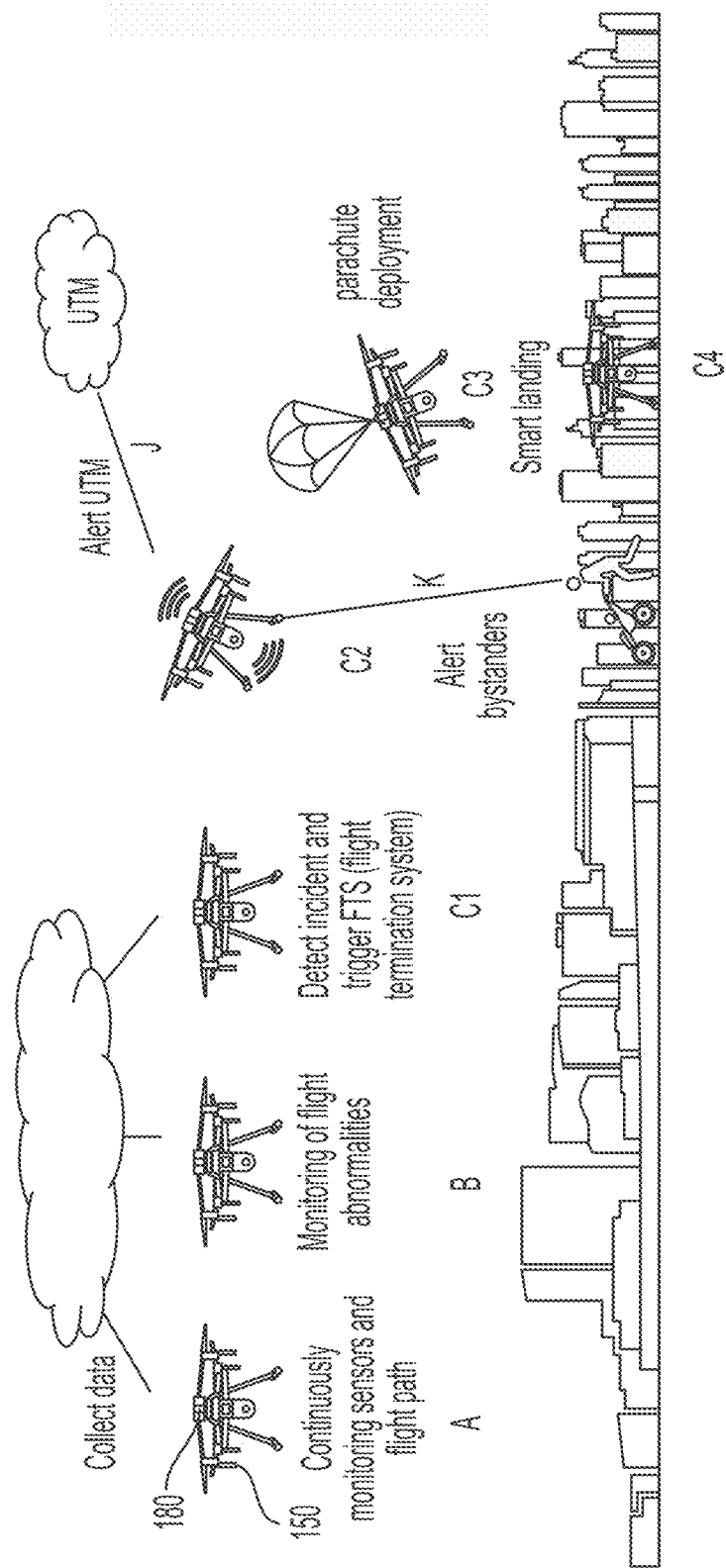
FIG. 14 is a schematic illustration of the operation of a UAV during different modes.

FIG. 14 schematically illustrates an exemplary UAV 150 equipped with safety apparatus 180 of the invention, when operating, autonomously or in conjunction with a remote operator, in one of the following three modes:

A. Monitoring mode—The failure detection unit monitors the signals output from each on-board sensor to determine whether they are representative of conditions of duress.

The sensors generally include an inertial measurement unit (IMU) having one or more of an accelerometer, gyroscope, and magnetometer to determine a current airborne orientation and acceleration of the UAV.

A predetermined flight path stored in a memory device of the failure detection unit is also monitored by receiving signals indicative of current UAV altitude which are output from a barometer, signals indicative of current UAV geographical location output from a GPS sensor, and signals indicative of current UAV speed output from an airspeed sensor.

Environmental sensors, such as an UV sensor, temperature sensor and humidity sensor, may be used to estimate the deterioration of the UAV body for purposes of predictive maintenance.

Monitoring continuity of wireless communication with respect to the UAV is made possible by a serial communication unit.

B. Flight Abnormality mode—A flight abnormality, or a relative low-degree failure, is detected in this mode. When a relative low-degree failure, such as a crack in a rotor blade, is detected in response to sensor readings, an updated flight path is transmitted to the memory device to force the UAV to fly to a specified ground station, to undergo a repair or maintenance operation. The following is a non-limiting list of relative low-degree failures:

a) deviation from a predetermined angular orientation;

b) deviation from a predetermined change in angular orientation;

c) deviation from predetermined translational or angular acceleration;

d) deviation from predetermined altitude;

e) deviation from predetermined flight path;

f) predetermined drop in UAV battery voltage as determined by a voltage sensor; and g) loss in communication as evidenced by an inability to be properly guided.

C. Critical Failure mode—A critical, or relative high-degree, irreversible UAV failure is detected in this mode. A relative high-degree failure may be detected when the value of a sensor reading, or a combination of sensor readings, is significantly greater than a predetermined threshold relative to that which is indicative of a relative low-degree failure. Alternatively, the profile of a signal output, such as a predetermined spike, is uniquely characteristic of a relative high-degree failure. In this mode, the UAV rotors or other flight generators are deactivated in step C1, a critical failure alert signal J is transmitted to an unmanned aircraft traffic management system (UTM) to make neighboring UAVs aware of the critical failure and an alert signal K is transmitted to bystanders in step C2 to prevent occurrence of a catastrophic event, the UAV-equipped parachute is deployed as described hereinabove in step C3, and a smart landing procedure is performed, for example as described in copending WO 2018/173040 by the same Applicant, whereby a safety-ensuring processing unit is operable in conjunction with a downwardly facing collision avoidance system to calculate a required direction of descent in order to avoid a detected obstacle and to cause a sufficient number of airfoils to become circumferentially displaced, to cause the descending UAV to change its direction of descent in order to avoid the obstacle, for example autonomously, in step C4.

Safety apparatus 180 may be an add-on device, configured as one or more interconnected housings which are mounted on an existing UAV, in order to upgrade the existing UAV.

The failure detection unit may be provided at the bottom of the same housing in which the parachute deployment apparatus is retained.

Figure 15:
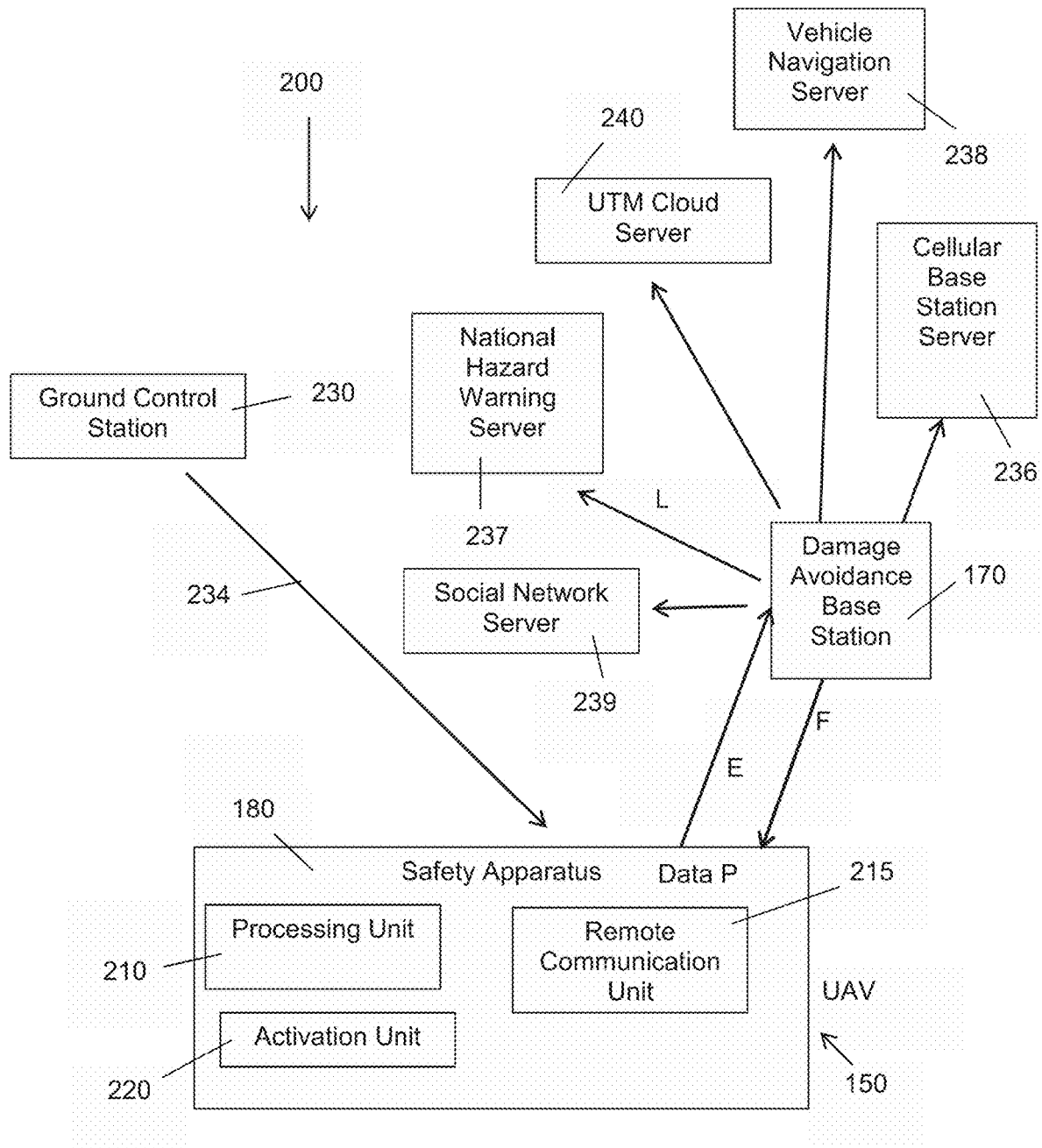
FIG. 15 is a schematic illustration of a UAV-based damage avoidance system.

FIG. 15 illustrates a UAV-based damage avoidance system 200. Although only one UAV 150 is shown, system 200 is configured to communicate with a plurality of UAVs 150 simultaneously.

Damage avoidance system 200 comprises a damage avoidance base station 170 in data communication with the safety apparatus 180 of each UAV 150 in order to sample UAV-specific data P at a frequency of at least once a second, for example five times a second. Safety apparatus 180 communicates with damage avoidance base station 170 by one of various mobile communication technology means such as cellular, LTE, 5G, WiMax and Zigbee. Damage avoidance base station 170, which is embodied by one or more computerized devices such as a web server, smartphone, laptop computer, or any other platform suitable for communicating with safety apparatus 180, is able to sample UAV-specific information such as instantaneous location, direction, height, flight speed and descent rate.

Damage avoidance base station 170 is also in data communication by means of an Application Programming Interface (API) with at least one server, such as cellular base station server 236, national hazard warning server 237, vehicle navigation warning server 238, social network server 239 and UTM cloud server 240, in order to transmit thereto, generally in parallel, alarm signals in response to identification of a UAV-specific critical failure. The API is configured to prioritize transmissions sent by base station 170. Damage avoidance base station 170 is able to communicate with servers 236-240 by one of various mobile communication technology means such as cellular, LTE, 5G, WiMax and Zigbee.

A corresponding communication channel is continuously established between base station 170 and each of servers 236-240. A corresponding network monitoring device, such as a Ping WatchDog, may be used to verify that base station 170 is interconnected with a given server or with the airborne safety apparatus 180 by using Internet Control Message Protocol (ICMP) ping replies. The system administrator immediately corrects a failure related to a lack of interconnectivity if a ping rely is not returned.

System 200 may also comprise ground control station (GCS) 230, which is manned with one or more operators, usually interacting with a remote flight controller to generate a beacon 234, characterized by a broadband video and data link, to control the flight path or various components of a UAV 150. One operator may control more than one UAV.

It will be appreciated that system 200 is operable without GCS 230, when a UAV 150 operates autonomously.

Figure 17:
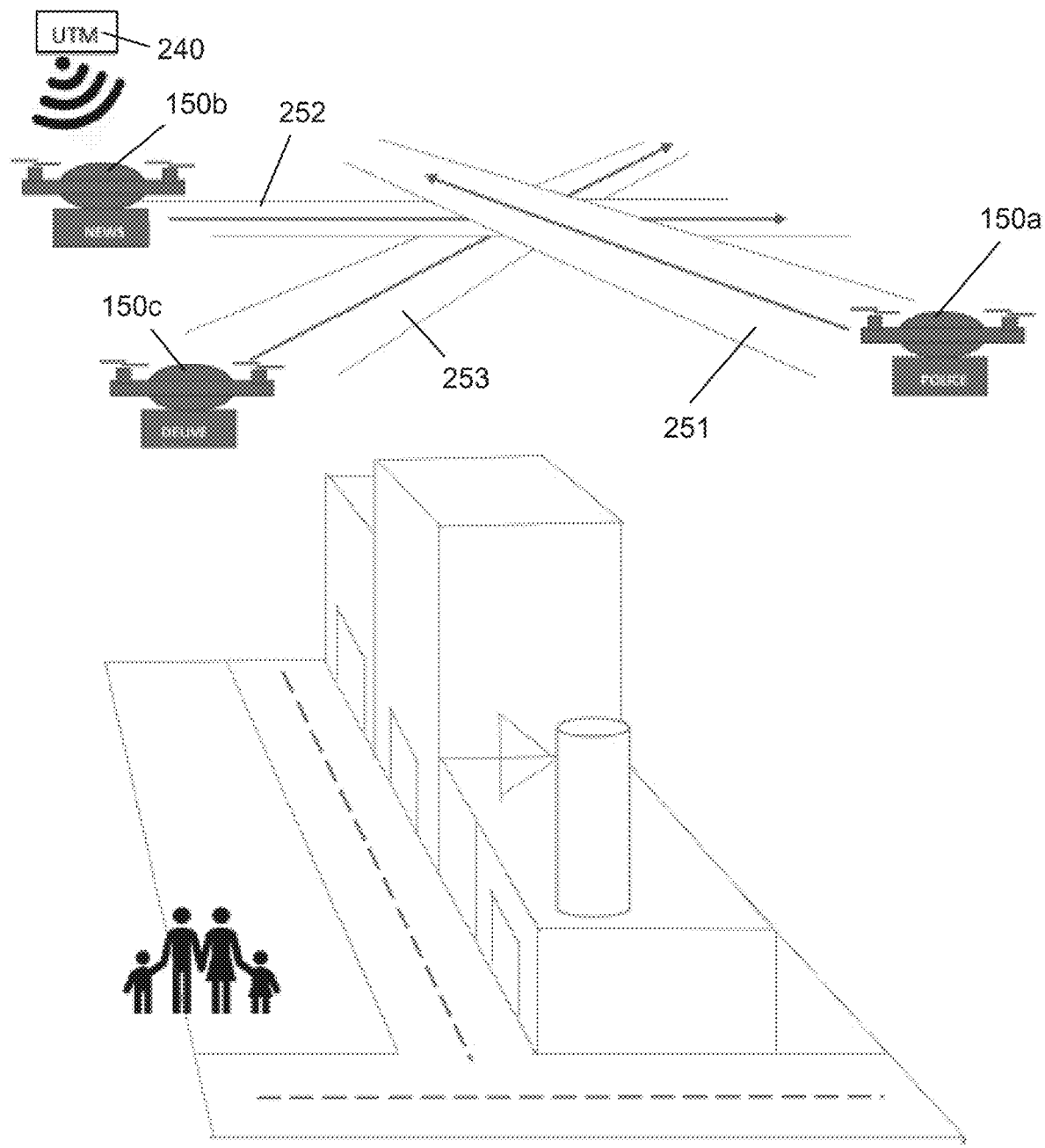
FIG. 17 is a schematic illustration of three UAV-specific different-altitude flight paths generated by an UTM.

UTM cloud server 240 comprises sophisticated communication and processing equipment that are configured to allocate low-altitude airspace to each of a plurality of UAVs 150, so that each can fly along a unique flight path. FIG. 17 schematically illustrates the generation of three different-altitude flight paths 251-3 by UTM 240, along which UAVs 150a-c, respectively, are authorized to fly. For example, UAV 150a may be a police UAV that allows law enforcement agents to observe an event from a different view, UAV 150b may be a UAV that is commissioned by a news agency, and UAV 150c may provide delivery services. The capabilities of UTM 240 are advantageously enhanced by system 200, whereby it communicates with neighboring UAV as to the onset of a critical failure event involving one of the registered UAVs.

Safety apparatus 180 of UAV 150 is configured with three main units: (1) processing unit 210 for processing the on-board sensor outputs to determine the existence of a relative low-degree or high-degree failure, generally in conjunction with failure detection unit 135 and analysis unit 137 shown in FIG. 76, (2) remote communication unit 215 for generating and transmitting an encrypted signal E provided with a UAV identifier to GCS 230, if in data communication therewith, in order to transmit the data associated with the output from each on-board sensor, or to damage avoidance base station 170 so as to be indicative of a critical failure alarm signal, or to receive an encrypted command signal F from base station 170, and (3) activation unit 220 for activating the flight generator deactivation unit, parachute deployment apparatus, warning devices for bystanders, and emergency landing equipment, if necessary.

After base station 170 receives critical failure indicating alarm signal E from airborne safety apparatus 180, the base station in turn transmits an encrypted critical failure indicating alarm signal L to each of the servers 236-240 with which it is registered, generally in parallel, in accordance with the instantaneous location identifier of UAV 150. All entities in communication with one the servers and in danger range of a failed UAV will be warned by the given server through a suitable emergency alert to immediately change location and to avoid damage or injury. For example, cellular base station server 236 will notify its subscribers who are in danger range of a failed UAV by a pop-up text message.

Figure 18:
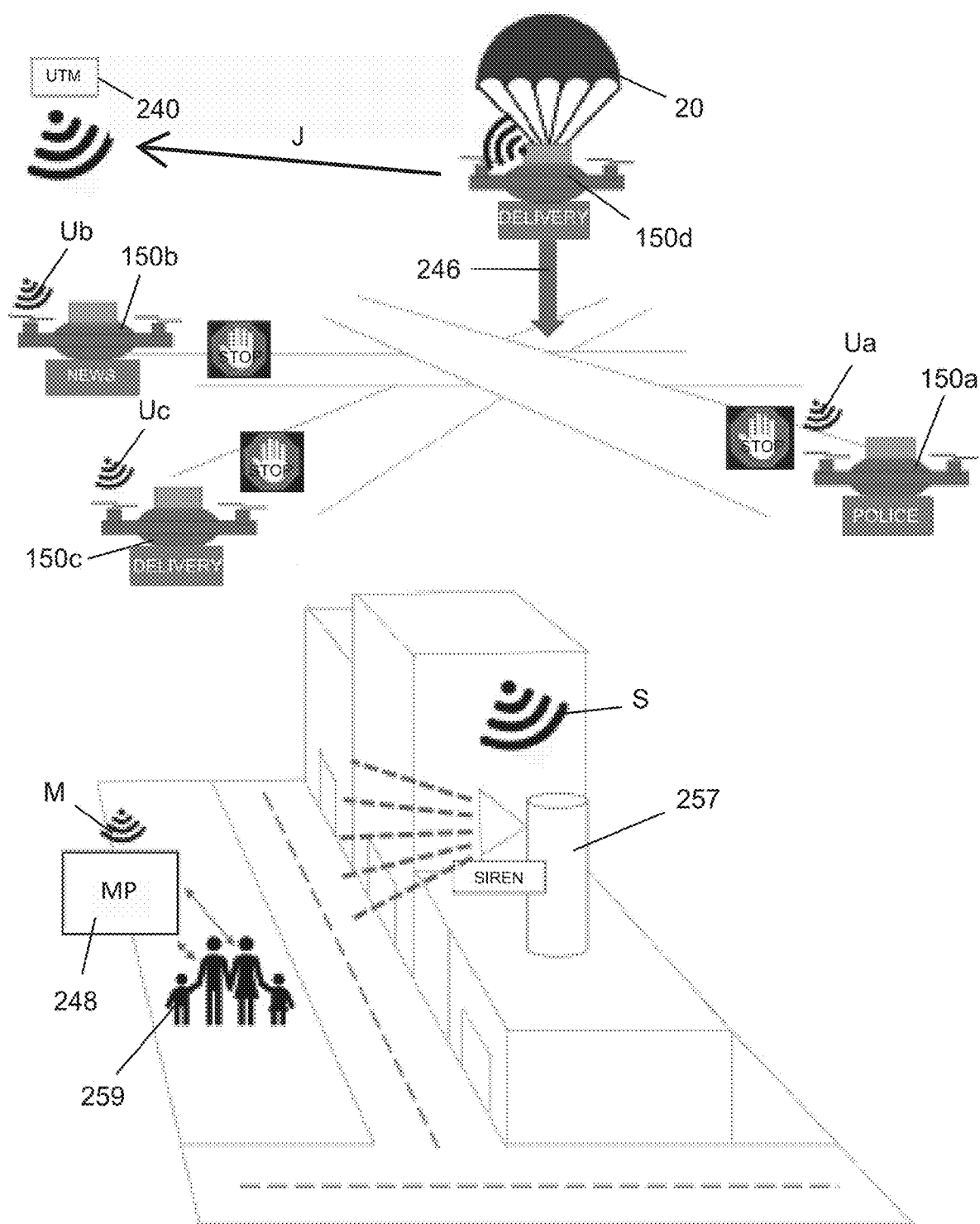
FIG. 18 is a schematic illustration of the means for avoiding a collision between a UAV flying along one of the different-altitude flight paths of FIG. 17 and a failed UAV.

As schematically illustrated in FIG. 18, immediately following detection of a relative high-degree failure, the UAV 150d experiencing the critical failure event (referred to herein as the "failed UAV") transmits a critical failure alarm signal J by means of the damage avoidance base station to UTM 240. The critical failure alarm signal J generally includes a current location and altitude of the failed UAV 150d as well as its instantaneous calculated descent path 246. Since the failed UAV 150d commences a descending operation after having terminating its flight and deploying its parachute 20, the failed UAV is liable to pass through the airspace of UAVs flying at lower altitudes and cause a dangerous collision. To prevent such a dangerous occurrence, UTM 240 transmits update signals Ua-c, each of which being representative of an UAC-specific updated flight path, simultaneously to all UAVs 150a-c, respectively, which are predicted to cross, or to be in the vicinity of, e.g. within 5 meters, the descent path 246 of the failed UAV 150d, so that these neighboring UAVs 150a-c will fly away from the vicinity of the descent path. The failed UAV 150d may generate its descent path 246, which may be dynamic for example in response to visualized obstacles, following initiation of the parachute deploying operation and transmit the instantaneous descent path to UTM 240.

UTM 240 is also adapted to alert bystanders 259 as to the approaching failed UAV. UTM 240 is able to access the local cellular base station and to determine which mobile phones (MP) 248, such as smartphones, held by corresponding users are in the vicinity of the forecasted descent path 246 of failed UAV 150d, generally at ground level 243. An alert signal M is then transmitted to these mobiles phones 248 over the cellular network to allow the users to find immediate shelter. These users are generally afforded up to 10 seconds to find shelter since the descent rate of a parachuted UAV is on the order of 3-4 m/s and the UAV generally fly at an altitude of 50-100 m. An alert signal 5 may also be transmitted by UTM 240 to the receiver of an on-ground siren 257, so that a loud warning sound will be immediately emitted thereby, to indicate to bystanders located in the vicinity of the descent path of failed UAV 150d that they must immediately significantly change their location or seek shelter.

Alternatively, UTM 240 alerts the neighboring UAVs and each neighboring UAV generates its own updated flight path.

In one embodiment, if the UTM fails to be interconnected to the system, as detected by the network monitoring device, the base station transmits update signals Ua-c to all UAVs 150a-c, respectively, and to alert bystanders 259 as to the approaching failed UAV.

When failed UAV 150d is a fixed-wing aircraft, parachute 20 may be deployed during the course of a descending operation as a fixed-wing aircraft is configured to glide following deactivation of each lift generator by the lift generator deactivation unit. The failed UAV 150d transmits the glide path by means of the damage avoidance base station to UTM 240 to alert the neighboring UAVs 150a-c. When the failure detection unit detects a UAV acceleration that is greater than a predetermined value, e.g. 3.0 m/s², which is indicative of the commencement of a free fall rather than of a gliding operation, a parachute deploying operation is then automatically initiated.

The descent path of the failed UAV is calculated by a processor of the damage avoidance base station.

Figure 18A:
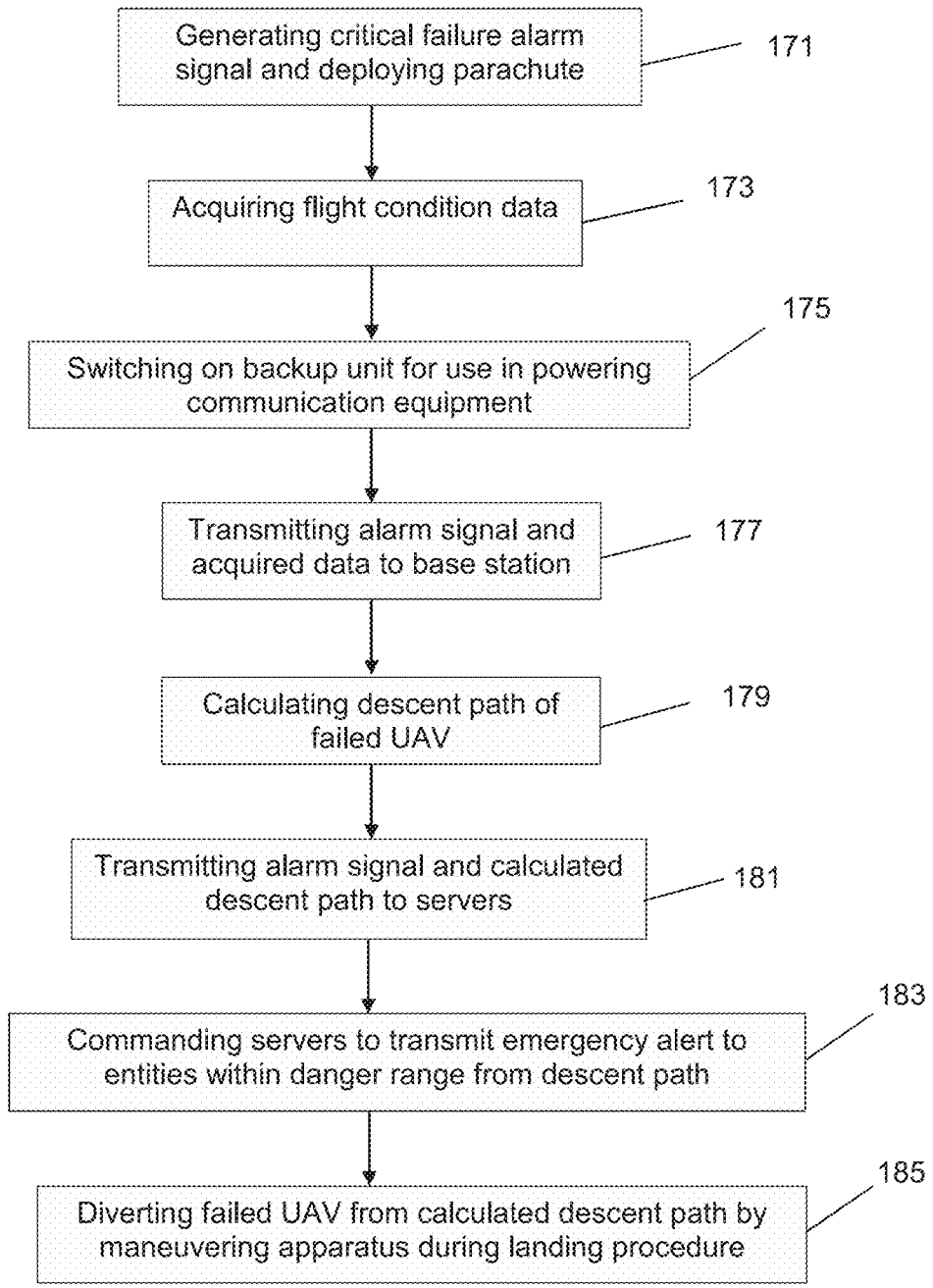
FIG. 18A is a method for mitigating damage with the system of FIG. 15.

As illustrated in the method of FIG. 18A according to an embodiment, after a critical failure alarm signal is generated and a parachute is deployed in step 171, data representative of the current flight conditions including UAV platform altitude, UAV location, UAV direction, UAV descent rate, wind speed, and wind direction is acquired in step 173 by on-board sensors. Data related to wind speed or wind direction is acquired from a local meteorological station if the safety apparatus lacks the corresponding sensor. This acquired data is transmitted in step 177 to the damage avoidance base station together with the critical failure alarm signal. In order to ensure reliable transmission of the alarm signal and of the acquired data to the base station even when the main battery voltage is low, or the failed aerial vehicle is suffering from a failure that prevents it from being properly guided, a backup power unit that is independent of the main UAV battery is switched on to continue powering the wireless communication equipment in step 175.

The processor of the base station then calculates the descent path of the failed UAV in step 179 according to stored instructions from the starting altitude acquired in step 173 to an anticipated landing area, taking into account drift due to wind gusts and the starting UAV descent rate and direction. The base station transmits in step 181 a critical failure indicating alarm signal to each server with which it is in data communication, together with data representative of the calculated descent path, commanding the servers to transmit an emergency alert signal in step 183 to all entities, whether neighboring UAVs or bystanders located within danger range from the calculated descent path, at any point thereof. When the server is the UTM server, the emergency alert signal may be an update signal that is indicative of an aerial vehicle specific updated flight path that causes each of the neighboring aerial vehicles to urgently change its flight path to avoid collision with the failed aerial vehicle. The danger range may be a radius of up to three times the starting altitude.

Rather than landing at the end of the calculated descent path, the failed UAV is able to be maneuvered relative to the calculated descent path during landing by maneuvering apparatus, such as circumferentially displaceable airfoils in step 185. The smart landing controller, which acquires the calculated descent path from the base station, is operable to divert the failed UAV from the calculated descent path during an emergency landing procedure to land on an open area, such as one having an open area of at least twice the projected area of the failed UAV and which is free from obstacles or humans, for example a roof or a plot of land.

Figure 16:
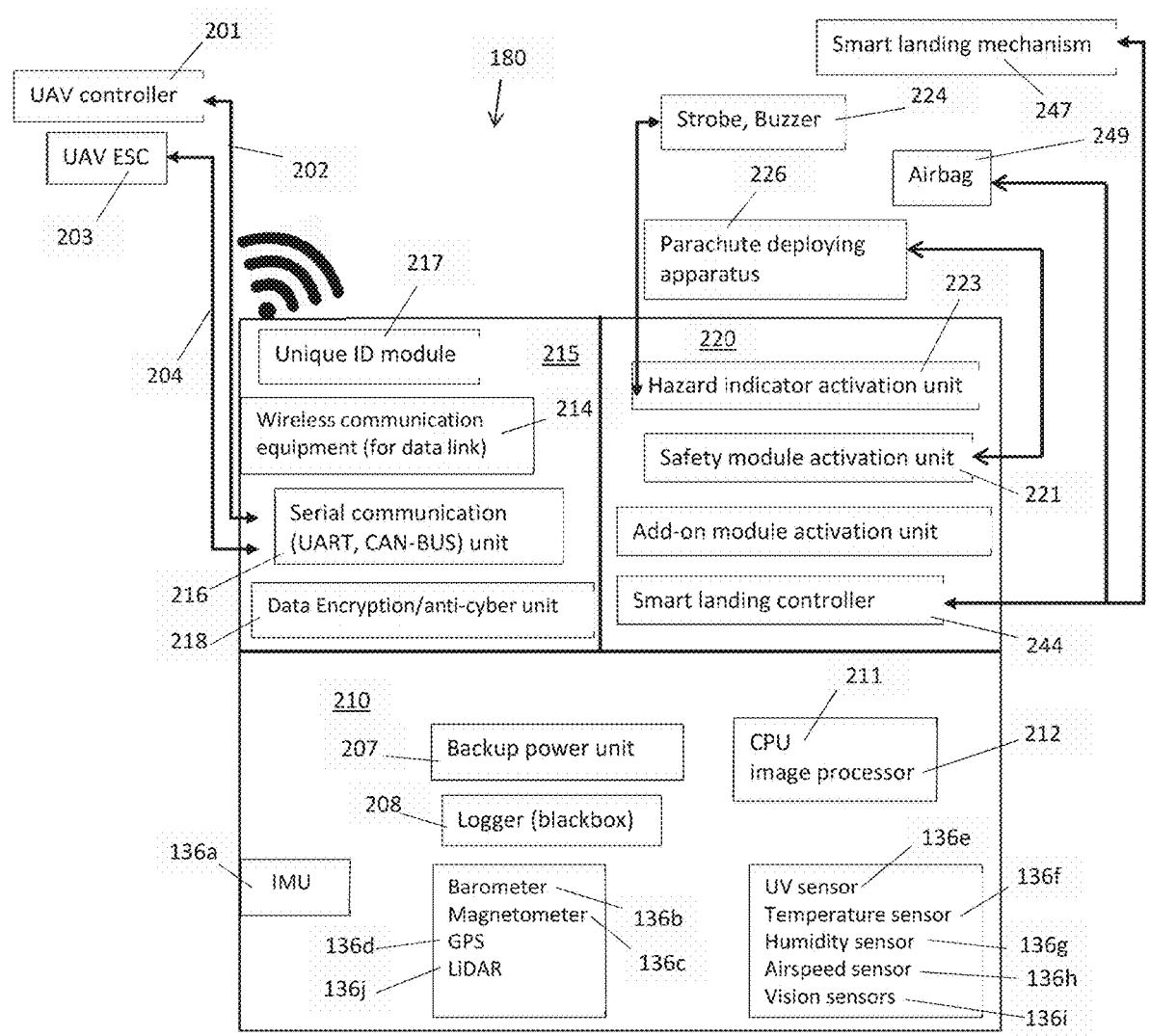
FIG. 16 is a schematic illustration of components of safety apparatus usable in conjunction with the system of FIG. 15.

FIG. 16 schematically illustrates components of safety apparatus 180. Safety apparatus 180 need not comprise all of the illustrated components; the number of types of components provided with safety apparatus 180 is dependent upon the desired implementation.

Processing unit 210 may comprise the following on-board sensors: IMU 136a, barometer 136b, magnetometer 136c, GPS sensor 136d for determining real-time UAV locations and for purposes of geo-fencing, UV sensor 136e, temperature sensor 136f, humidity sensor 136g, airspeed sensor 136h, and vision sensor 136i and LiDAR sensor 136j for use in conjunction with a smart landing procedure. The location identifier detected by GPS sensor 136d is sampled sufficiently frequently for at least once a second, for example five times a second, to be considered a real-time or instantaneous identifier, and may be transmitted in accordance with a 5G communication system. The battery voltage may be determined through the serial communication unit 216 of remote communication unit 215, or alternatively through a voltage sensor. If the battery voltage is low, a backup power unit 207 continually connected to processing unit 210 that is independent of the UAV battery may be employed. Backup power unit 207 is activated by means of an internal interface, and is used to power the entire safety apparatus 180, including communication unit 215 and the on-board sensors. All of these sensor outputs may be recorded in one or more loggers 208 that are protected in a black box-type arrangement. Some sensor outputs are processed by a CPU 211, and some are processed by an image processor 212.

In remote communication unit 215, wireless communication equipment 214 is used to establish a data link with the GCS or with the UTM. Any time a data link is made, a UAV identifier stored in module 217 is included in the transmitted signal, which is encrypted by unit 218. Serial communication unit 216 is in communication with the UAV controller 201, i.e. autopilot, via bus 202 and with the UAV electronic speed controller (ESC) 203 via bus 204.

Activation unit 220 comprises safety module activation unit 221, generally configured with a rotor deactivation unit, or a deactivation unit for any other lift generator, and parachute deploying apparatus 226, or deploying apparatus for any other type of fabric used for a damage mitigating operation. Activation unit 220 may also comprise a hazard indicator activation unit 223 that includes warning devices 224 for bystanders, such as a strobe light and a buzzer. The strobe light is visible when the UAV is located at a significant height above ground level, e.g. 150 m, and the buzzer is audible when the UAV is located at a relatively low height above ground level, e.g. 50 m, yet the bystander is afforded sufficient time to be distanced from the descending UAV after sensing the alarm signal generated by a warning device 224 as the descent rate of the UAV under the influence of a deployed parachute is less than 5 m/s. Activation unit 220 may also comprise a smart landing mechanism 247 configured to perform emergency landing under the guidance of a smart landing controller 244, which may also command the deployment of an airbag 249 to reduce the impact with an existing surface during an emergency landing procedure.

In other implementations, the safety apparatus according to any embodiment described herein may be used not only for deploying a parachute, but also for deploying other damage mitigating fabric types that are retained in a chamber attached to the UAV body. For example, a net mesh made from a strong fiber such as Kevlar® or Dyneema®, when deployed, may be used to entrap a malicious UAV. Alternatively, a fire suppressing fabric, such as one made of Kevlar® and interspersed with fiberglass, may be deployed.

Figure 19:
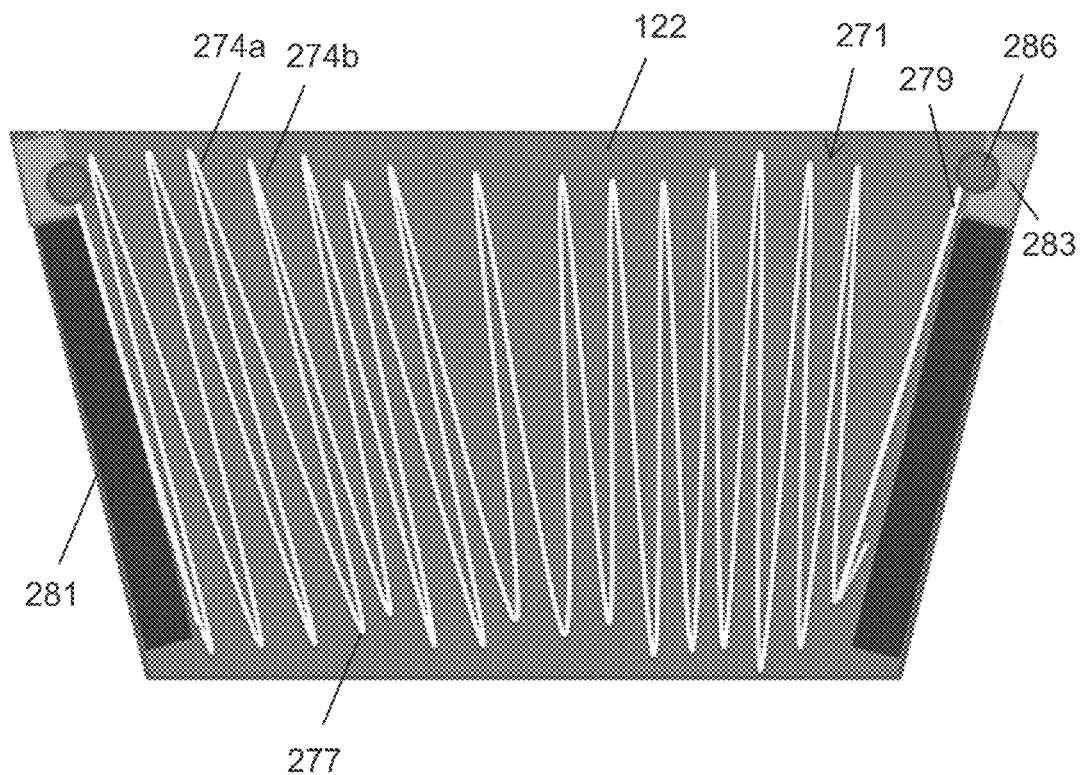
FIG. 19 is a cross sectional view of the chamber of FIG. 13, showing a fabric in a folded undeployed condition retained therewithin and attached to projectiles while each of the hollow tubes within each a corresponding projectile rod is receivable is removed.

As shown in FIG. 19, the fabric 271 is retained in a folded undeployed condition within chamber 122. Fabric 271 may be folded in the same way for any desired implementation of the safety apparatus. A group of folded portions 274 of fabric 271 is retained within chamber 122 between two adjacent U-shaped, or otherwise hollow, e.g. concave, portions 126 of chamber 122 (FIG. 13), such that a first folded portion 274a is separated without contact from a second folded portion 274b adjacent to folded portion 274a, with the exception of an expandable crease 277 between folded portions 274a and 274b. Projectile rod 281 is insertable within an oblique tube that is secured within the interior of a corresponding portion 126, and a peripheral portion 279 of fabric 271 is attached by attachment means 286 to a corresponding projectile 283 at the distal end of rod 281.

The number of projectiles 283 employed is dependent upon the weight or size of fabric 271. For example, if fabric 271 has a weight of 500 g, four projectiles 283 that are circumferentially and evenly spaced around the periphery of circular chamber 122 by an angular spacing of 90 degrees and attached to a peripheral portion 279 of fabric 271 will be used to ensure an optimal uniform ejection of the fabric from chamber 122.

Although not shown, fabric 271 is continuous with other groups of folded portions each of which retained between a different pair of hollow portions 126. Chamber 122 may have any desired shape, for example circular or polygonal.

An exemplary folded condition is shown, such that second folded portion 274b is positioned to the side of first folded portion 274a, but it will be appreciated that any other suitable folded portion orientation and condition is within the scope of the invention, insofar as each folded portion 274 is able to be expanded uninhibitedly and rapidly upon ejection of the projectiles 283 from chamber 122.

Fabric 271 is able to achieve a desired expanded dimension simultaneously with ejection of the plurality of projectiles 283 from chamber 122 by virtue of a combination of the following factors: (a) a rapidly reacting gas generator, (b) the obliquely extending hollow tubes through which the generated gas flows applies an explosive force onto each projectile, causing each projectile to be propelled distally in a different direction by a distance designed to cause the fabric to become tensioned when expanded and to perform a desired damage mitigating action, and (c) the undeployed fabric is stored within the chamber in a folded condition such that each folded portion of the fabric is separated without contact from another folded portion, allowing each folded portion to be expanded uninhibitedly and rapidly. For example, the fabric is fully deployable within less than a second, e.g. within less than 0.3 sec, following a gas generator triggering event initiated remotely by an operator or by other means, such as imaging means. The imaging means may be configured to identify a malicious UAV, or one that has intruded into an unauthorized flight zone, or to identify the presence of a fire, and to deploy fabric 271 once the initiating UAV provided with the safety apparatus and the imaging means is within deploying range of a target.

It will be appreciated that fabric 271 may also be satisfactorily expanded to perform a damage mitigating operation even when the hollow tubes through which the generated gas flows do not extend obliquely with respect to the manifold, but rather extend substantially parallel to the longitudinal axis of the manifold.

Figure 20:
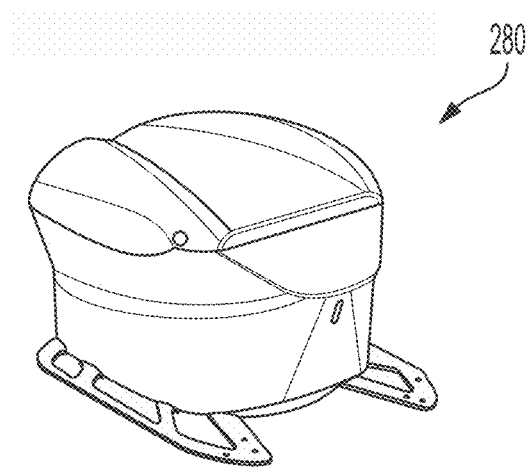
FIG. 20 is a perspective view of another embodiment of safety apparatus.
Figure 21:
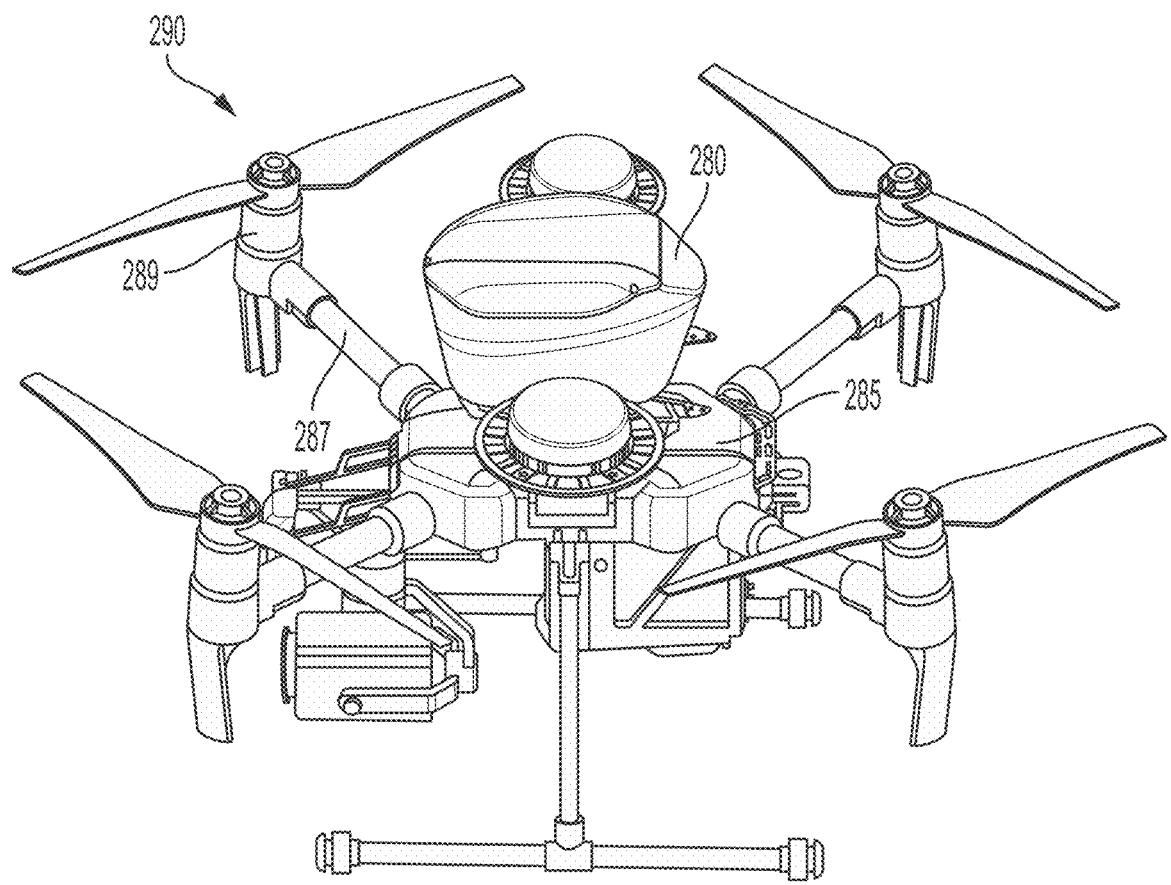
FIG. 21 is a perspective view of a UAV, to a platform of which is secured the safety apparatus of FIG. 20.

FIGS. 20 and 21 illustrate the secured positioning of safety apparatus 280, which may comprise one or more components of safety apparatus 180 of FIG. 16, on top of a region of the platform 285 of UAV 290 which is central to the plurality of rotor arms 287. Each rotor arm 287 carries one or more rotors 289 functioning as a lift generator. The fabric-retaining chamber including the hollow portions thereof may be connected to the housing of safety apparatus 280. Alternatively, safety apparatus 280 may be securely positioned to the underside of platform 285. The retained fabric may be unconnected to the housing of safety apparatus 280 or to the body of UAV 290 so as not to limit the distance to which the fabric may be propelled.

Figure 22:
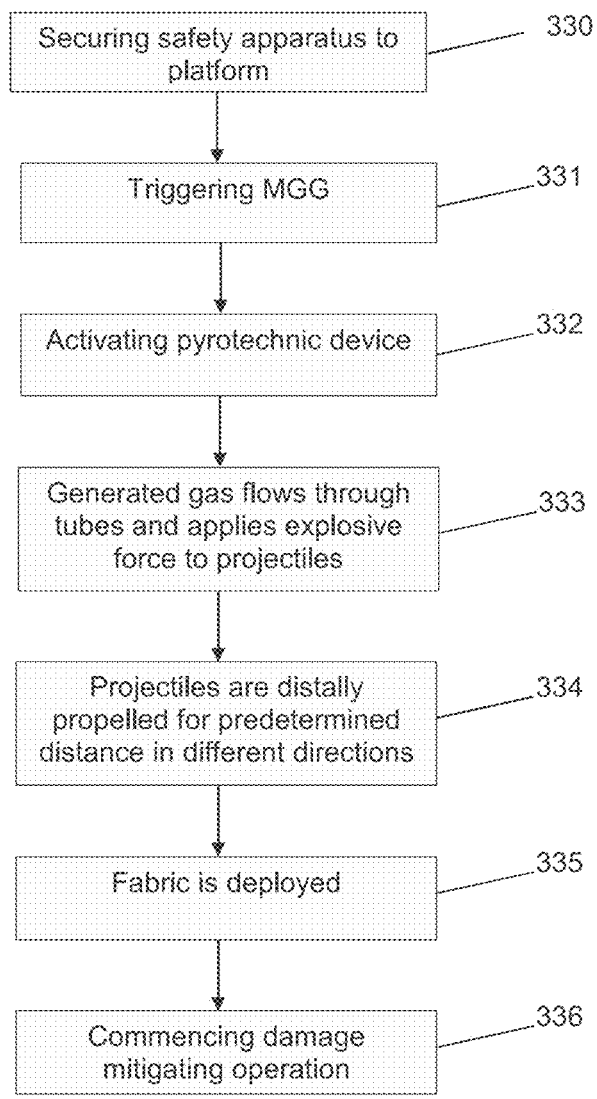
FIG. 22 is a flow chart of a damage mitigating operation.

As shown in FIG. 22, a damage mitigating operation may be performed after the safety apparatus is secured to a platform in step 330, whether a fixed platform or a movable platform. Following triggering the MGG in step 331 by electrical or mechanical means, the pyrotechnic device becomes activated in step 332, causing the constituent components of the propellant to react and to generate energy intensive gas. The generated gas simultaneously flows through each tube extending from the manifold in step 333, applying an explosive force onto a corresponding projectile. The explosive force is converted into momentum, and each projectile is therefore distally propelled in a different direction for a predetermined distance in step 334. This distance is reliably achieved by providing a sufficient dose of combustible material and a sufficient amount of activation current, to cause the fabric to be deployed in step 335 by being expanded to a desired dimension. The predetermined distance to which the projectiles are propelled by the explosive force may range from 15-50 m, e.g. 20 m, when the projectiles are ejected upwardly, and may be up to 100 m when the projectiles are ejected downwardly.

While the fabric is fully expanded, the projectiles, whether upwardly ejected projectiles, downwardly ejected projectiles or laterally ejected projectiles, remain attached by the attached peripheral portion of the fabric after having transferring their kinetic energy to the fabric to urge the latter to an expanded condition. Since the projectiles are propelled a significant distance, the expanded fabric is ensured of not becoming entangled with a rotating lift generator, and therefore is no need for deactivating the lift generator. A damage mitigating operation is then commenced in step 336 through the intervention of the expanded fabric.

Figure 23:
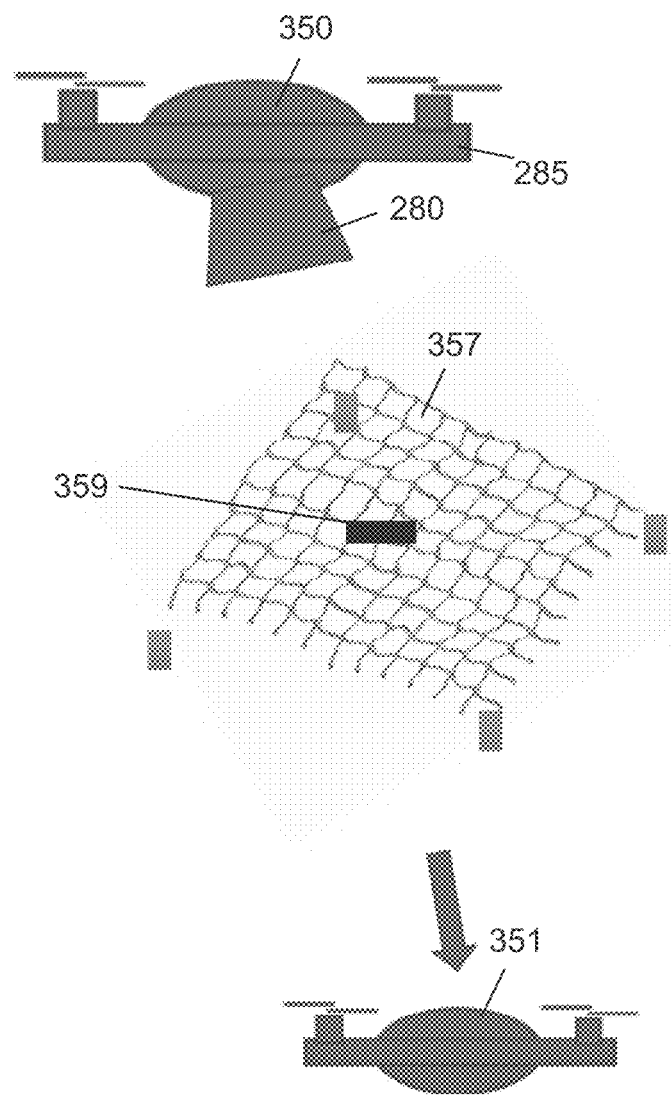
FIG. 23 is a schematic illustration of a damage mitigating operation by which an unwanted UAV is intercepted.

FIG. 23 illustrates an implementation of deploying a net in order to intercept an unwanted UAV 351. When unwanted UAV 351 is discovered, for example when found by an imaging system to be dangerously close to a security facility such as an army base or an airport, safety apparatus 280 of intercepting UAV 350 is activated. Safety apparatus 280 is mounted below the platform 285 of intercepting UAV 350, so that when intercepting UAV 350 is located above unwanted UAV 351 and safety apparatus 280 is activated in response to an autonomously or remotely generated triggering signal, net 357 will be downwardly ejected to intercept and entrap unwanted UAV 351. Net 357 may be configured with auxiliary parachute deploying apparatus 359, which is configured to be automatically deployed when net 357 becomes engaged with unwanted UAV 351, such as by means of one or more sensors, to prevent damage to underlying bystanders if the intercepted UAV 351 were to undergo a dangerous free fall. Alternatively, net 357 may remain connected to safety apparatus 280 or to the body of intercepting UAV 350 by a tow line, to facilitate the towing of intercepted UAV 351 to a ground station.

Figure 24:
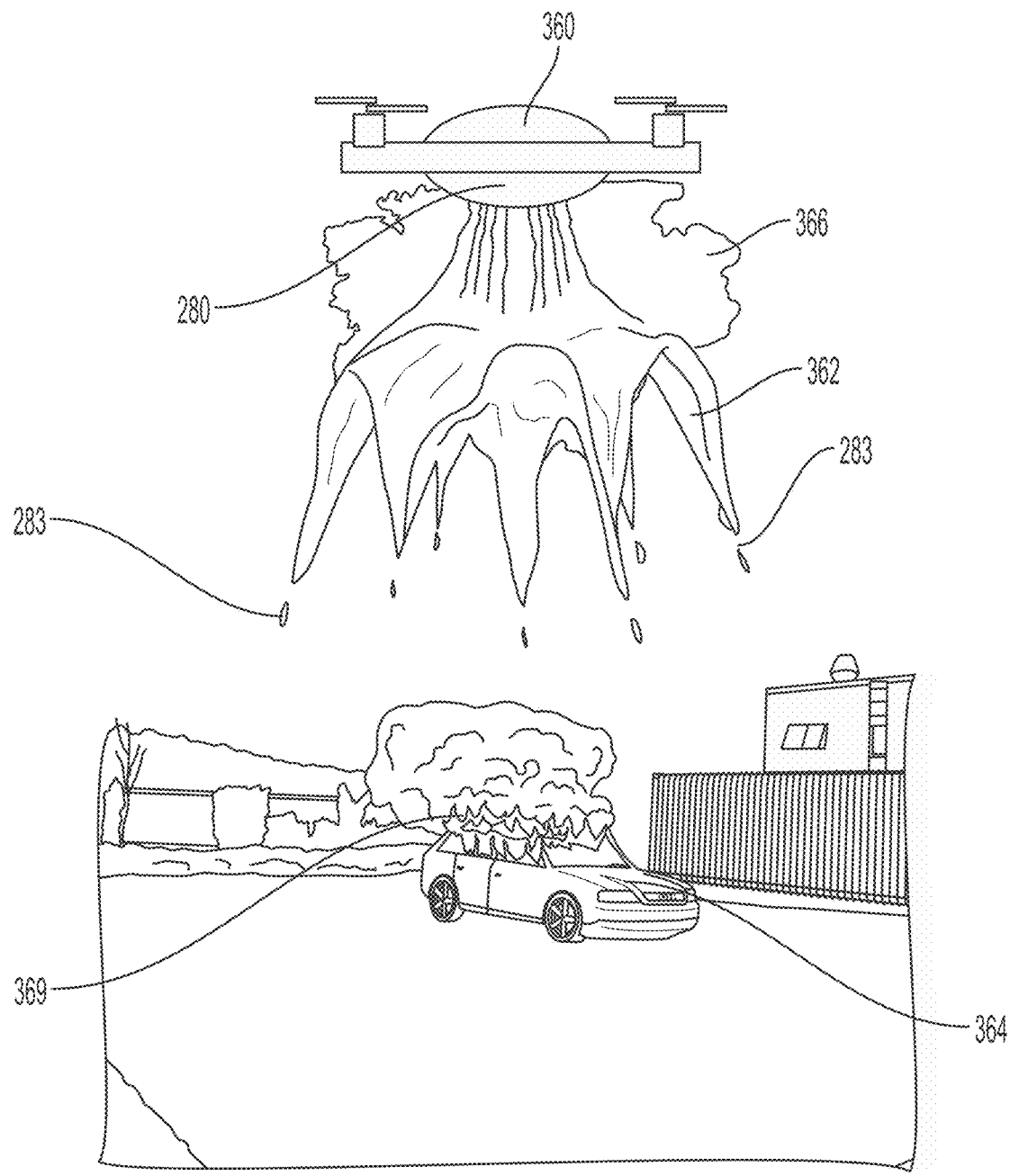
FIG. 24 is an illustration of a damage mitigating operation by which a burning fire is suppressed.
Figure 25:
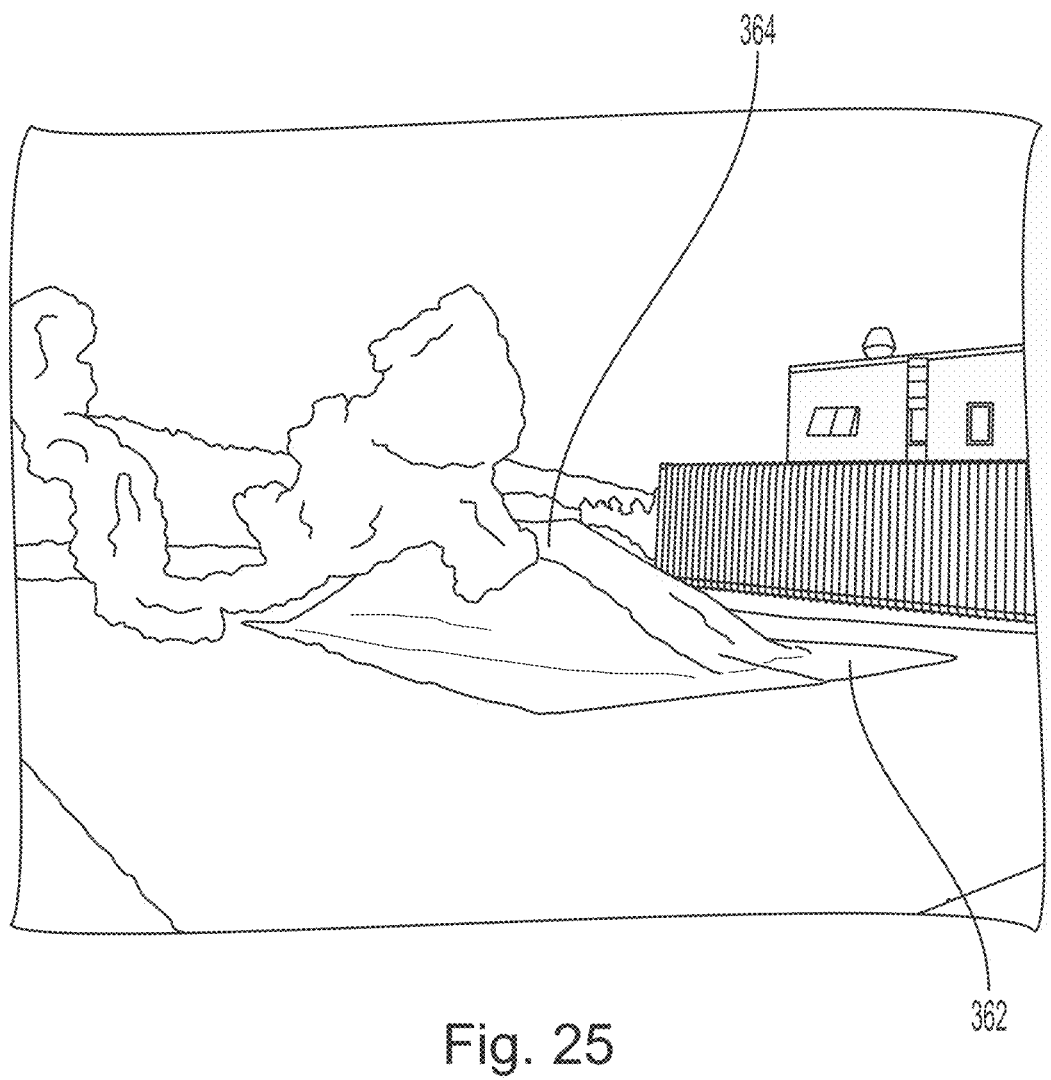
FIG. 25 is an illustration of the positioning of a fire suppressing fabric following the damage mitigating operation of FIG. 24.

FIGS. 24 and 25 illustrate an implementation of deploying fire suppressing fabric 362 for extinguishing a burning motor vehicle 364 by means of downwardly directed safety apparatus 280 mounted on an initiating UAV 360. This arrangement may likewise be used for helping to extinguish a fire of serious ramifications, for example one that is burning within a high-story structure or at a forest.

Fabric 362 is made of an inflammable material, which, after being deployed in a spread and expanded condition and having been positioned to cover substantially the entire source of fire, will smother the fire by limiting or altogether excluding the exposure of the fire to oxygen.

Fire suppressing fabric 362 is shown in FIG. 24 after having been ejected downwardly from the safety apparatus by the generated gas 366 while the projectiles 283 gravitationally direct the expanded fabric onto the fire 369 that is burning within motor vehicle 364. The predetermined angular disposition relative to a horizontal plane of the plurality of projectiles 283, defined by the safety apparatus, is dependent upon the weight and size of fabric 362; a larger fabric requires a correspondingly larger angle relative to a horizontal plane, and vice versa for a smaller fabric. Fabric 362 is shown in FIG. 25 to completely cover the motor vehicle 364 while the fire is being smothered.

Figure 26:
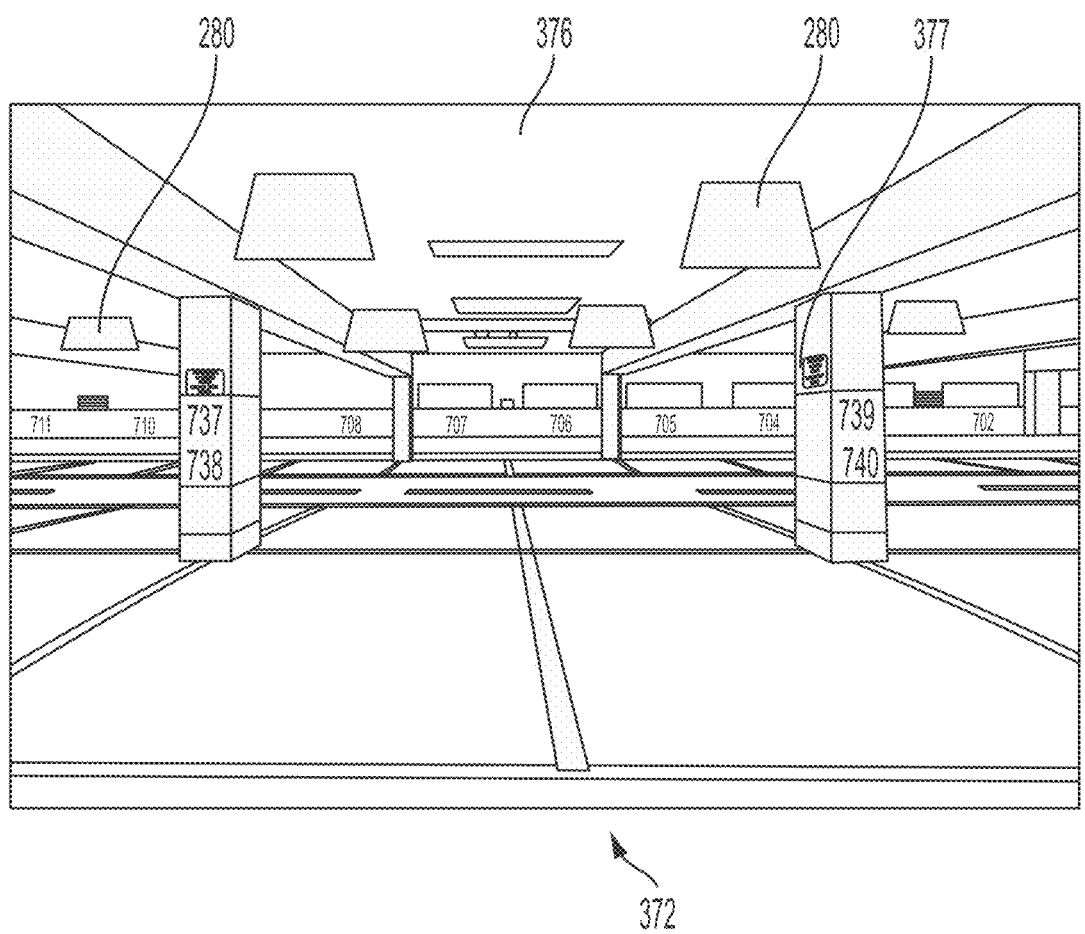
FIG. 26 is a perspective view of an indoor structure within which a plurality of safety apparatus units are mounted to facilitate a fire suppressing operation.

FIG. 26 illustrates an implementation of deploying fire suppressing fabric for extinguishing a fire that is burning within a parking lot 372, or within any other indoor structure, by means of a plurality of downwardly directed safety apparatus units 280 mounted on the ceiling 376 of the parking lot 372. A plurality of heat sensors 377 interspersed within parking lot 372 may be the stimulus of the triggering signal, in order to deploy a fabric located proximately to the source of the detected fire.

The use of fire suppressing fabric is advantageous relative to a sprinkler system or fire extinguishers since the widespread damage caused by discharged water or powder is able to be avoided.

Figure 27:
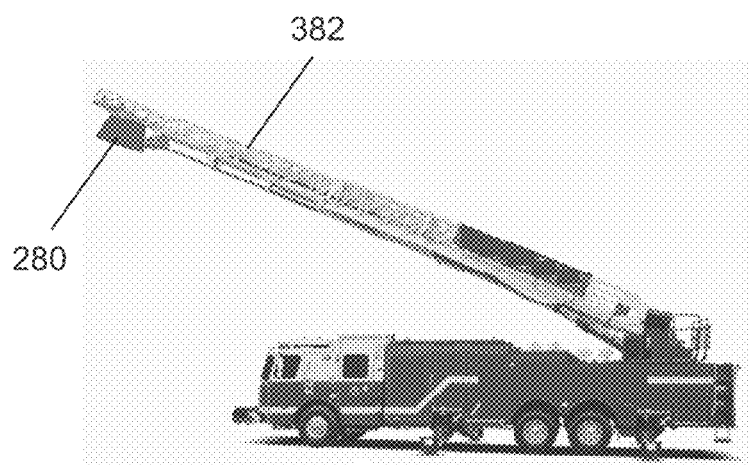
FIG. 27 is a perspective view of a fire truck, at the end of a ladder of which is mounted safety apparatus used for fire suppression.

FIG. 27 illustrates an implementation of deploying fire suppressing fabric by means of downwardly directed safety apparatus 280 mounted at the end of a fire truck ladder 382.

Figure 28:
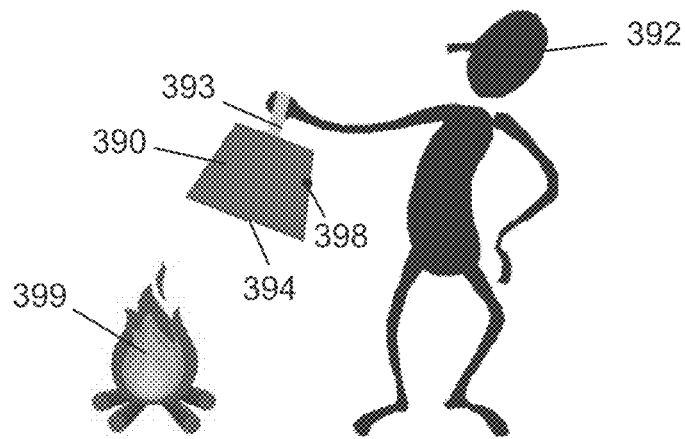
FIG. 28 is a schematic illustration of a fire suppressing operation with the use of hand-held damage mitigating apparatus.

FIG. 28 illustrates an implementation of deploying fire suppressing fabric by means of hand-held safety apparatus 390, which may be configured similarly to safety apparatus 10 of FIGS. 1-4. When user 392 has become aware of fire 399, the handle 393 of apparatus 390 is held such that the distal end 394 of apparatus 390 is facing the fire 399, whether distal end 394 is downwardly directed, upwardly directed or laterally directed. A triggering action is then initiated by depressing a dedicated button 398, or otherwise manipulating a suitable input device, to activate the gas generator. Since the projectiles are designed to be propelled a relatively small distance on the order of up to only a few meters, often less than one meter, the corresponding recoil force experienced by user 392 is of a sufficiently relatively small magnitude to be dissipated by the user's body.

Example 1

The parachute deploying apparatus weighing 450 gm was carried by a multi-rotor UAV having a weight of 7 kg, a diameter of 1.10 m and a height of 0.5 m. The canopy was made of Nylon 66 ripstop fabric, and had a diameter of 1.75 m. Six suspension lines, each having a length of 1.6 m, were connected to the aircraft. Three draw cords, each having a length of 25 cm, were connected to a corresponding projectile configured with an arrow-shaped head.

Three inclined tubes extended from the manifold. A projectile having a weight of 23 gm, and an arrow-shaped head connected to a rod having a length of 6 cm was inserted within a corresponding tube. Flexible polymeric material was applied to the tubes, providing sealing after insertion of the corresponding projectile therewithin.

The single MGG that was threadedly engageable with the manifold was the Autoliv A7Zr2.1, IMI-Type 610258300, manufactured by Autoliv, Ogden, Utah. The MGG had a diameter of 1.5 cm and a length of 4 cm. The pyrotechnic device produced 8 liters of nitrogen.

The projectiles were propelled a distance of 112.5 cm within a time period of 0.28 seconds after the trigger was initiated.

Example 2

During the flight of a six-rotor UAV, a crack developed in one of the rotor blades. The failure detection unit initiated the Flight Abnormality mode, and the UAV was forced to fly to a specified ground station, in order to repair the crack.

An accelerometer operable in the 200 Hz range was employed to acquire vibration amplitude readings. Vibration amplitude of less than 0.5 $m/s^2$ is reflective of normal UAV operation. Vibration amplitude of greater than 0.5 $m/s^2$ is reflective of an anomalous flight condition, such as the development of a crack in a rotor blade. Vibration amplitude of greater than 3.0 $m/s^2$ is reflective of a critical failure that requires the immediate termination of flight and the deployment of a parachute.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. An aerial vehicle based damage avoidance system, comprising:
   a) a plurality of aerial vehicles, each flying along a unique flight path and comprising a body, at least one lift generator provided with the aerial vehicle body, a lift generator deactivation unit and a plurality of flight dependent systems;
   b) parachute deployment apparatus interactable with an undeployed parachute which is retained in a chamber attached to said aerial vehicle body;
   c) one or more servers; and
   d) a base station in data communication with said plurality of aerial vehicles and said one or more servers, wherein said base station is in data communication by means of an Application Programming Interface (API) and a corresponding continuously established communication channel with each of said one or more servers,
   wherein each of said aerial vehicles comprises safety apparatus for mitigating damage to nearby bystanders or aerial vehicles when the aerial vehicle is experiencing an unanticipated failure, said safety apparatus comprising:
   i. one or more on-board sensors including a location detector which are configured to detect flight related characteristics;
   ii. a processing unit configured to process outputs of each of the on-board sensors and to detect a critical failure;
   iii. a remote communication unit configured to transmit an instantaneous location identifier to said base station and to generate and transmit an aerial vehicle specific critical failure alarm signal to said base station following detection of the critical failure; and
   iv. an activation unit configured to activate a lift generator deactivation unit and the parachute deployment apparatus following detection of the critical failure, in order to initiate a descent operation along a descent path, wherein said safety apparatus is operational independently of said flight dependent systems one of which is liable to be malfunctioned due to the critical failure, wherein said base station is configured to calculate the descent path of the failed aerial vehicle and to transmit another failure indicating alert signal to said one or more servers for alerting, by an application or a wireless message, a corresponding electronic device accessible to all entities in communication with any of said two or more servers that are predicted to be within a danger range of the failed aerial vehicle relative to the calculated descent path, wherein said remote communication unit is in electrical communication with said activation unit and is operable to command activation of said parachute deploying apparatus and said lift generator deactivation unit following determination of the critical failure, wherein said parachute deployment apparatus comprises:

a manifold positioned within an interior of, and fixed to, the chamber, with said manifold is releasably coupled a single vessel within which pressurized gas is generated;

a gas generator which cooperates with said vessel;

a plurality of hollow tubes which extend distally from, and are in fluid communication with, said manifold; and a plurality of projectiles, each of which formed with a rod that is receivable in a corresponding one of said tubes and to each of which is connected a cord that is also connected to a corresponding portion of the undeployed parachute;

wherein the pressurized gas which is generated upon triggering of said gas generator is flowable through each of said tubes to propel said plurality of projectiles in different directions and to cause the parachute to become deployed, wherein said parachute deploying apparatus is configured to cause the parachute to achieve a desired canopy diameter simultaneously with ejection of the parachute from the chamber.

2. The system according to claim 1, wherein the one or more servers are configured to transmit an emergency alert, by an application or a wireless message, to the corresponding electronic device that is accessible to bystanders as to an approach of the failed aerial vehicle.

3. An aerial vehicle based damage avoidance system, comprising:

a) a plurality of aerial vehicles, each flying along a unique flight path and comprising a body and a plurality of flight dependent systems;

b) parachute deployment apparatus interactable with an undeployed parachute which is retained in a chamber attached to said aerial vehicle body;

c) one or more servers; and d) a base station in data communication with said plurality of aerial vehicles and said one or more servers, wherein said base station is in data communication by means of an Application Programming Interface (API) and a corresponding continuously established communication channel with each of said one or more servers, wherein each of said aerial vehicles comprises safety apparatus for mitigating damage to nearby bystanders or aerial vehicles when the aerial vehicle is experiencing an unanticipated failure, said safety apparatus comprising:

i. one or more on-board sensors including a location detector which are configured to detect flight related characteristics;

ii. a processing unit configured to process outputs of each of the on-board sensors and to detect a critical failure;

iii. a remote communication unit configured to transmit an instantaneous location identifier to said base station and to generate and transmit an aerial vehicle specific critical failure alarm signal to said base station following detection of the critical failure; and iv. an activation unit configured to activate a lift generator deactivation unit and the parachute deployment apparatus following detection of the critical failure, in order to initiate a descent operation along a descent path, wherein said safety apparatus is operational independently of said flight dependent systems one of which is liable to be malfunctioned due to the critical failure, wherein said base station is configured to calculate the descent path of the failed aerial vehicle and to transmit another failure indicating alert signal to said one or more servers for alerting, by an application or a wireless message, a corresponding electronic device accessible to all entities in communication with any of said two or more servers that are predicted to be within a danger range of the failed aerial vehicle relative to the calculated descent path, wherein one of the one or more servers is an unmanned aircraft traffic management system (UTM) server which is configured to allocate an airspace to each of said plurality of aerial vehicles and to thereby grant authorization to fly along the unique flight path, wherein said UTM server is configured to simultaneously transmit an update signal to all neighboring aerial vehicles that are predicted to cross the descent path of the failed aerial vehicle, said update signal being indicative of an aerial vehicle specific updated flight path that causes each of said neighboring aerial vehicles to urgently change its flight path to avoid collision with the failed aerial vehicle.

4. An aerial vehicle based damage avoidance system, comprising:

a) a plurality of aerial vehicles, each flying along a unique flight path and comprising a body and a plurality of flight dependent systems;

b) parachute deployment apparatus interactable with an undeployed parachute which is retained in a chamber attached to said aerial vehicle body;

c) one or more servers; and d) a base station in data communication with said plurality of aerial vehicles and said one or more servers, wherein said base station is in data communication by means of an Application Programming Interface (API) and a corresponding continuously established communication channel with each of said one or more servers, wherein each of said aerial vehicles comprises safety apparatus for mitigating damage to nearby bystanders or aerial vehicles when the aerial vehicle is experiencing an unanticipated failure, said safety apparatus comprising:

i. one or more on-board sensors including a location detector which are configured to detect flight related characteristics;

ii. a processing unit configured to process outputs of each of the on-board sensors and to detect a critical failure;

iii. a remote communication unit configured to transmit an instantaneous location identifier to said base station and to generate and transmit an aerial vehicle specific critical failure alarm signal to said base station following detection of the critical failure; and iv. an activation unit configured to activate a lift generator deactivation unit and the parachute deployment apparatus following detection of the critical failure, in order to initiate a descent operation along a descent path, wherein said safety apparatus is operational independently of said flight dependent systems one of which is liable to be malfunctioned due to the critical failure, wherein said base station is configured to calculate the descent path of the failed aerial vehicle and to transmit another failure indicating alert signal to said one or more servers for alerting, by an application or a wireless message, a corresponding electronic device accessible to all entities in communication with any of said two or more servers that are predicted to be within a danger range of the failed aerial vehicle relative to the calculated descent path, wherein the one or more servers are configured to transmit an emergency alert, by an application or a wireless message, to the corresponding electronic device that is accessible to bystanders as to an approach of the failed aerial vehicle, wherein said base station is also in data communication with a local cellular base station that is in communication range of the descent path of the failed aerial vehicle, and is thereby configured to determine which one or more mobile phones held by corresponding users are located in the vicinity of the descent path of the failed aerial vehicle and to transmit an alert signal to the one or more mobiles phones over a cellular network to allow the corresponding users to find immediate shelter.

5. The system according to claim 2, wherein the corresponding electronic device is a receiver of an on-ground siren, so that a warning sound will be immediately emitted thereby, to indicate to bystanders located in damage range of the descent path of the failed aerial vehicle that they must immediately significantly change their location or seek shelter.

6. The system according to claim 1, wherein the processing unit is additionally configured to additionally process the outputs of each of the on-board sensors, to detect a flight abnormality in the aerial vehicle in which the processing unit is mounted, and to initiate generation of another aerial vehicle specific updated flight path that forces the aerial vehicle to fly to a specified ground station and to undergo a repair or maintenance operation, a flight abnormality being a failure of a lower degree than the critical failure.

7. The system according to claim 3, wherein each of the aerial vehicles additionally comprises:

at least one lift generator provided with the aerial vehicle body; and the lift generator deactivation unit, wherein the communication unit is in electrical communication with the activation unit and is operable to command activation of the parachute deploying apparatus and the lift generator deactivation unit following determination of the critical failure, wherein deactivation of each of the at least one lift generator by the lift generator deactivation unit ensures that the parachute that is being expanded by the parachute deploying apparatus will not become entangled with a rotating lift generator.

8. The system according to claim 7, wherein the parachute deployment apparatus comprises:

a manifold positioned within an interior of, and fixed to, the chamber, with said manifold is releasably coupled a single vessel within which pressurized gas is generated;

a gas generator which cooperates with said vessel;

a plurality of hollow tubes which extend distally and upwardly from, and are in fluid communication with, said manifold; and a plurality of projectiles, each of which formed with a rod that is receivable in a corresponding one of said tubes and to each of which is connected a cord that is also connected to a corresponding portion of the undeployed parachute;

wherein the pressurized gas which is generated upon triggering of said gas generator is flowable through each of said tubes to propel said plurality of projectiles in different directions and to cause the parachute to become deployed, wherein the parachute deploying apparatus is configured to cause the parachute to achieve a desired canopy diameter simultaneously with ejection of the parachute from the chamber.

9. The system according to claim 1, wherein each of the aerial vehicles additionally comprises a landing mechanism, maneuvering apparatus, and a controller, wherein the controller is configured to control landing of the aerial vehicle in conjunction with the landing mechanism and the maneuvering apparatus.

10. The system according to claim 9, wherein the controller is operable to command deployment of an airbag for reducing impact with an existing surface during a landing procedure.

11. The system according to claim 9, wherein the landing mechanism is operable in conjunction with at least one LiDAR sensor for detecting obstacles.

12. The system according to claim 1, wherein the activation unit comprises one or more warning devices configured to generate an alert signal for alerting bystanders as to an approach of the failed aerial vehicle when the failed aerial is at a specific height above ground level.

13. The system according to claim 7, wherein each of the aerial vehicles additionally comprises a battery configured to power the at least one lift generator and a voltage sensor or a serial communication unit provided with the remote communication unit for determining voltage of the battery, and wherein the safety apparatus further comprises a backup power unit that is independent of the battery and that is employed when the battery voltage is less than a predetermined value.

14. The system according to claim 1, wherein the remote communication unit is configured to transmit an instantaneous location identifier to said base station and to generate and transmit an aerial vehicle specific critical failure alarm signal to said base station following detection of the critical failure when the failed aerial vehicle is suffering from a guidance-preventing failure selected from the group consisting of a drop in the battery voltage of less than the predetermined value, a loss in flight dependent communication, a failure to an autopilot, and a failure in a positioning system of the aerial vehicle.

15. The system according to claim 13, wherein the backup power unit is configured to power the safety apparatus, including the remote communication unit and the one or more on-board sensors, and is continually connected to the processing unit.

16. The system according to claim 3, wherein the one or more servers are configured to transmit an emergency alert, by an application or a wireless message, to the corresponding electronic device that is accessible to bystanders as to an approach of the failed aerial vehicle, wherein the corresponding electronic device is a receiver of an on-ground siren, so that a warning sound will be immediately emitted thereby, to indicate to bystanders located in damage range of the descent path of the failed aerial vehicle that they must immediately significantly change their location or seek shelter.

17. The system according to claim 4, wherein the one or more servers are configured to transmit an emergency alert, by an application or a wireless message, to the corresponding electronic device that is accessible to bystanders as to an approach of the failed aerial vehicle, wherein the corresponding electronic device is a receiver of an on-ground siren, so that a warning sound will be immediately emitted thereby, to indicate to bystanders located in damage range of the descent path of the failed aerial vehicle that they must immediately significantly change their location or seek shelter.

18. The system according to claim 1, wherein each of the aerial vehicles additionally comprises a battery configured to power the at least one lift generator and a voltage sensor or a serial communication unit provided with the remote communication unit for determining voltage of the battery, and wherein the safety apparatus further comprises a backup power unit that is independent of the battery and that is employed when the battery voltage is less than a predetermined value.

19. The system according to claim 4, wherein each of the aerial vehicles additionally comprises:
- at least one lift generator provided with the aerial vehicle body;
- the lift generator deactivation unit;
- a battery configured to power the at least one lift generator; and
- a voltage sensor or a serial communication unit provided with the remote communication unit for determining voltage of the battery, wherein the safety apparatus further comprises a backup power unit that is independent of the battery and that is employed when the battery voltage is less than a predetermined value, wherein the communication unit is in electrical communication with the activation unit and is operable to command activation of the parachute deploying apparatus and the lift generator deactivation unit following determination of the critical failure.

20. The system according to claim 1, wherein plurality of hollow tubes extend obliquely from the manifold.

* * * * *